US012280590B2

(12) United States Patent
Nakamura

(10) Patent No.: US 12,280,590 B2

(45) Date of Patent: Apr. 22, 2025

(54) CONVEYANCE DEVICE AND PRINTING DEVICE

(71) Applicant: FUJIFILM Corporation, Tokyo (JP)

(72) Inventor: Hayate Nakamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 234 days.

(21) Appl. No.: 18/313,352

(22) Filed: May 7, 2023

(65) Prior Publication Data

US 2023/0373230 A1 Nov. 23, 2023

(30) Foreign Application Priority Data

May 20, 2022 (JP) ................................ 2022-082949

(51) Int. Cl.
*B41J 11/00* (2006.01)

(52) U.S. Cl.
CPC ............ *B41J 11/007* (2013.01); *B41J 11/002* (2013.01); *B41J 11/0045* (2013.01)

(58) Field of Classification Search
CPC ..... B41J 11/007; B41J 11/002; B41J 11/0045; B41J 11/00216; B41J 11/0024
See application file for complete search history.

(56) References Cited

U.S. PATENT DOCUMENTS 10,449,786 B2 * 10/2019 Okayama ............ B41J 13/0054

FOREIGN PATENT DOCUMENTS

JP 6608963 11/2019

* cited by examiner

*Primary Examiner* — Bradley W Thies

(74) *Attorney, Agent, or Firm* — JCIPRNET

(57) ABSTRACT

Provided are a conveyance device and a printing device that suppress drying unevenness of a recording medium to be conveyed in a state where liquid is applied thereonto. The drying unevenness is suppressed by a conveyance device including: a holding member that holds a recording medium having a first surface onto which liquid is applied; a guide member having a guide surface that comes into contact with a second surface that is a surface opposite to the first surface of the recording medium; and a drive mechanism that drives the holding member and the guide member in a conveyance direction, in which the guide surface has either or both of hole portions and projection portions, and a diameter of the hole portion and the projection portion, or a diameter of an inscribed circle inscribed in the hole portion and the projection portion is 0.31 mm or less.

12 Claims, 18 Drawing Sheets

FIG. 14

| DIAMETER OF HOLE PORTION AND PROJECTION PORTION [mm] | DRYING UNEVENNESS VISIBILITY | CONVEYABILITY (CASE OF HOLE PORTION) | CONVEYABILITY (CASE OF PROJECTION PORTION) |
|---|---|---|---|
| 0.01 | A | D | D |
| 0.011 | A | C | D |
| 0.1 | B | B | B |
| 0.3 | B | B | B |
| 0.31 | C | B | B |
| 0.5 | D | A | A |

FIG. 20

| ANGLE OF HOLE PORTION ROW AND PROJECTION PORTION ROW WITH RESPECT TO PAPER WIDTH DIRECTION [°] | DRYING UNEVENNESS VISIBILITY |
|---:|:---:|
| 0.9 | D |
| 1 | B |
| 10 | A |
| $\tan^{-1}(d_2/d_1) - 1$ | B |
| $\tan^{-1}(d_2/d_1) - 0.9$ | D |

CONVEYANCE DEVICE AND PRINTING DEVICE

CROSS-REFERENCE TO RELATED APPLICATION

The present application claims priority under 35 U.S.C. § 119(a) to Japanese Patent Application No. 2022-082949 filed on May 20, 2022, which is hereby expressly incorporated by reference, in its entirety, into the present application.

BACKGROUND OF THE INVENTION

1. Field of the Invention

The present invention relates to a conveyance device and a printing device, and particularly relates to a technique of drying a recording medium on which an image is formed.

2. Description of the Related Art

There is known an ink jet recording device that forms an image on a recording medium to be conveyed by a conveyance unit by jetting ink from an ink jet head onto the recording medium. A guide surface of the conveyance unit that supports the recording medium may be provided with a plurality of irregularities depending on an application.

For example, JP6608963B discloses a conveyance drum having an attracting hole and a protrusion on an outer peripheral surface. With this conveyance drum, the recording medium can be stably conveyed.

SUMMARY OF THE INVENTION

However, since the conveyance drum disclosed in JP6608963B has different ease of heat transfer between the protrusion on the outer peripheral surface of the conveyance drum and a portion other than the protrusion, there is a problem that drying unevenness occurs in the recording medium to be conveyed by the conveyance drum in a state where liquid is applied thereonto.

The present invention has been made in view of such circumstances, and an object of the present invention is to provide a conveyance device and a printing device that suppress drying unevenness of a recording medium to be conveyed in a state where liquid is applied thereonto.

One aspect of a conveyance device for achieving the above-described object comprises: a holding member that holds a recording medium having a first surface onto which liquid is applied; a guide member having a guide surface that comes into contact with a second surface that is a surface opposite to the first surface of the recording medium; and a drive mechanism that drives the holding member and the guide member in a conveyance direction, in which the guide surface has either or both of hole portions and projection portions, and a diameter of the hole portion and the projection portion, or a diameter of an inscribed circle inscribed in the hole portion and the projection portion is 0.31 mm or less. According to this aspect, it is possible to suppress drying unevenness of the recording medium onto which the liquid is applied.

It is preferable that the diameter of the hole portion and the projection portion, or the diameter of the inscribed circle inscribed in the hole portion and the projection portion is 0.3 mm or less. Thereby, it is possible to further suppress the drying unevenness of the recording medium onto which the liquid is applied.

It is preferable that the diameter of the hole portion and the projection portion, or the diameter of the inscribed circle inscribed in the hole portion and the projection portion is 0.1 mm or more. Thereby, it is possible to stably convey the recording medium.

It is preferable that the hole portions and the projection portions are arranged in a direction with an angle of 1° with respect to a direction orthogonal to the conveyance direction. Thereby, it is possible to make the drying unevenness less visible.

It is preferable that a first conveyance device that conveys a recording medium in a conveyance direction, and a second conveyance device that is disposed on a downstream side in the conveyance direction with respect to the first conveyance device and that conveys the recording medium in the conveyance direction are provided, that the first conveyance device includes a first guide member having a first guide surface that comes into contact with a second surface that is a surface opposite to a first surface of the recording medium, that the first guide surface has either or both of first hole portions and first projection portions, that the second conveyance device includes a second guide member having a second guide surface that comes into contact with the second surface of the recording medium, that the second guide surface has either or both of second hole portions and second projection portions, and that one of a first direction in which either or both of the first hole portions and the first projection portions are arranged, and a second direction in which either or both of the second hole portions and the second projection portions are arranged is a direction orthogonal to the conveyance direction, and the other has an angle of 1° or more with respect to the direction orthogonal to the conveyance direction. Thereby, it is possible to make the drying unevenness less visible.

It is preferable that in a case in which $d_1$ is a distance between groups in a direction orthogonal to the conveyance direction in a plurality of groups formed by either or both of the hole portions and the projection portions whose center positions are present on a straight line parallel to the conveyance direction, and $d_2$ is a distance between centers of either or both of the hole portions and the projection portions adjacent to each other in the conveyance direction, the hole portions and projection portions are arranged in a direction with an angle of $\{\tan^{-1}(d_2/d_1)-1\}°$ or less with respect to the direction orthogonal to the conveyance direction. Thereby, it is possible to make the drying unevenness less visible.

It is preferable that a first conveyance device that conveys a recording medium in a conveyance direction, and a second conveyance device that is disposed on a downstream side in the conveyance direction with respect to the first conveyance device and that conveys the recording medium in the conveyance direction are provided, that the first conveyance device includes a first guide member having a first guide surface that comes into contact with a second surface that is a surface opposite to a first surface of the recording medium, that the first guide surface has either or both of first hole portions and first projection portions, that the second conveyance device includes a second guide member having a second guide surface that comes into contact with the second surface of the recording medium, that the second guide surface has either or both of second hole portions and second projection portions, and that one of a first direction in which either or both of the first hole portions and the first projection portions are arranged, and a second direction in which either or both of the second hole portions and the second projection portions are arranged is a direction orthogonal to the conveyance direction, and the other has an angle of $\{\tan^{-1}(d_2/d_1)-1\}°$ or less with respect to the direction orthogonal to the conveyance direction.

Here, in a case in which the first direction is the direction orthogonal to the conveyance direction, $d_1$ is a distance between groups in the direction orthogonal to the conveyance direction in a plurality of groups formed by either or both of the second hole portions and the second projection portions whose center positions are present on a straight line parallel to the conveyance direction, and $d_2$ is a distance between centers of either or both of the second hole portions and the second projection portions adjacent to each other in the conveyance direction. In a case in which the second direction is the direction orthogonal to the conveyance direction, $d_1$ is a distance between groups in the direction orthogonal to the conveyance direction in a plurality of groups formed by either or both of the first hole portions and the first projection portions whose center positions are present on the straight line parallel to the conveyance direction, and $d_2$ is a distance between centers of either or both of the first hole portions and the first projection portions adjacent to each other in the conveyance direction. Thereby, it is possible to make the drying unevenness less visible.

It is preferable that the guide surface has the hole portions, and that an opening ratio per unit area of the hole portions on the guide surface is in a range of 3% or more and 9% or less. Thereby, it is possible to achieve both the suppression of the drying unevenness and the stability of the conveyance.

It is preferable that the guide surface has the projection portions, and that a proportion per unit area of the projection portions on the guide surface is in a range of 3.8% or more and 12.6% or less. Thereby, it is possible to make the drying unevenness less visible.

It is preferable that the drive mechanism drives the holding member and the guide member by making a moving speed of the holding member and a moving speed of the guide surface different from each other. Thereby, it is possible to further suppress the drying unevenness. It is preferable that a difference between the moving speed of the holding member and the moving speed of the guide surface is a difference in moving speed such that a difference in moving distance between the holding member and the guide surface during a period in which the second surface of the recording medium is in contact with the guide surface is equal to or greater than the diameter of the hole portion and the projection portion or the diameter of the inscribed circle inscribed in the hole portion and the projection portion. Thereby, it is possible to prevent positions corresponding to the hole portions and the projection portions on the second surface of the recording medium from being fixed during the conveyance of the recording medium, so that it is possible to further suppress the drying unevenness.

It is preferable that the guide member is a cylindrical drum, that the guide surface is an outer peripheral surface of the drum, that the holding member is a gripper provided on the drum, and that the drive mechanism rotates the drum about an axis of the drum. Thereby, it is possible to suppress the drying unevenness in the conveyance using the drum.

It is preferable that the holding member is a gripper attached to an endless chain, that the guide member is an endless belt, that the guide surface is a surface of the belt, and that the drive mechanism drives the gripper and the belt in the conveyance direction. Thereby, it is possible to suppress the drying unevenness in the conveyance using the chain gripper and the belt.

It is preferable that the conveyance device further comprises a drying mechanism that heats the first surface of the recording medium of which the second surface is in contact with the guide surface. Thereby, it is possible to dry the recording medium while suppressing the drying unevenness.

One aspect of a printing device for achieving the above-described object comprises: a first conveyance device that conveys a recording medium in a conveyance direction; a liquid jetting head that jets liquid onto a first surface of the recording medium to be conveyed by the first conveyance device to form an image; a second conveyance device that is disposed on a downstream side in the conveyance direction with respect to the first conveyance device and that conveys the recording medium in the conveyance direction; and a drying mechanism that dries the liquid of the recording medium to be conveyed by the second conveyance device, in which the first conveyance device includes a first holding member that holds the recording medium, a first guide member having a first guide surface that comes into contact with a second surface that is a surface opposite to the first surface of the recording medium, and a first drive mechanism that drives the first guide member in the conveyance direction, the first guide surface has either or both of first hole portions and first projection portions, a diameter of the first hole portion and the first projection portion, or a diameter of an inscribed circle inscribed in the first hole portion and the first projection portion is 0.31 mm or less, the second conveyance device includes a second holding member that holds the recording medium, a second guide member having a second guide surface that comes into contact with the second surface of the recording medium, and a second drive mechanism that drives the second guide member in the conveyance direction, the second guide surface has either or both of second hole portions and second projection portions, a diameter of the second hole portion and the second projection portion, or a diameter of an inscribed circle inscribed in the second hole portion and the second projection portion is 0.31 mm or less, and one of a first direction in which either or both of the first hole portions and the first projection portions are arranged, and a second direction in which either or both of the second hole portions and the second projection portions are arranged is a direction orthogonal to the conveyance direction, and the other has an angle of 1° or more and $\{\tan^{-1}(d_2/d_1)-1\}°$ or less with respect to the direction orthogonal to the conveyance direction.

Here, in a case in which the first direction is the direction orthogonal to the conveyance direction, $d_1$ is a distance between groups in the direction orthogonal to the conveyance direction in a plurality of groups formed by either or both of the second hole portions and the second projection portions whose center positions are present on a straight line parallel to the conveyance direction, and $d_2$ is a distance between centers of either or both of the second hole portions and the second projection portions adjacent to each other in the conveyance direction, and in a case in which the second direction is the direction orthogonal to the conveyance direction, $d_1$ is a distance between groups in the direction orthogonal to the conveyance direction in a plurality of groups formed by either or both of the first hole portions and the first projection portions whose center positions are present on the straight line parallel to the conveyance direction, and $d_2$ is a distance between centers of either or both of the first hole portions and the first projection portions adjacent to each other in the conveyance direction. According to this aspect, in a case in which liquid is applied to a recording medium and dried, the drying unevenness of the recording medium can be suppressed.

According to the present invention, it is possible to suppress the drying unevenness of the recording medium onto which the liquid is applied.

BRIEF DESCRIPTION OF THE DRAWINGS

FIG. 14 is a table showing evaluation of drying unevenness visibility and conveyability with respect to diameters of a projection portion of the printing drum and a hole portion of the conveying belt.

FIG. 20 is a table showing evaluation results of a relationship between angles of hole portion rows and projection portion rows with respect to the paper width direction and visibility of drying unevenness.

DESCRIPTION OF THE PREFERRED EMBODIMENTS

Hereinafter, preferred embodiments of the present invention will be described with reference to the accompanying drawings.

Occurrence of Drying Unevenness

Drying unevenness may occur in an image formed by an ink jet recording device. The drying unevenness is a phenomenon in which shading occurs in an image, and includes a phenomenon in which a part of the image appears dark and a phenomenon in which a color is lost and the image appears white and faint. The drying unevenness occurs in a case in which a landed ink moves on a recording medium.

Ink movement is likely to occur in a case in which a temperature distribution on the recording medium is non-uniform. In a case in which the temperature distribution is non-uniform, the ink is likely to dry in an area where the temperature is high, and the ink is difficult to be dried in an area where the temperature is low. In the area where the ink is likely to dry, the ink is concentrated and a surface tension is increased. On the contrary, in the area where the ink is difficult to be dried, the surface tension is relatively small because the ink is not concentrated so much. This difference in surface tension causes the ink to move from the area where the surface tension is small to the area where the surface tension is large, resulting in drying unevenness.

The inventor of the present application has found that there is a problem that a non-uniform temperature distribution occurs depending on a shape of the guide surface of the conveyance unit, and drying unevenness occurs. For example, in a case in which the guide surface has irregularities, the irregularities cause non-uniform contact with the recording medium, and a degree of heat transfer to the recording medium varies depending on the contact area.

Figure 1:
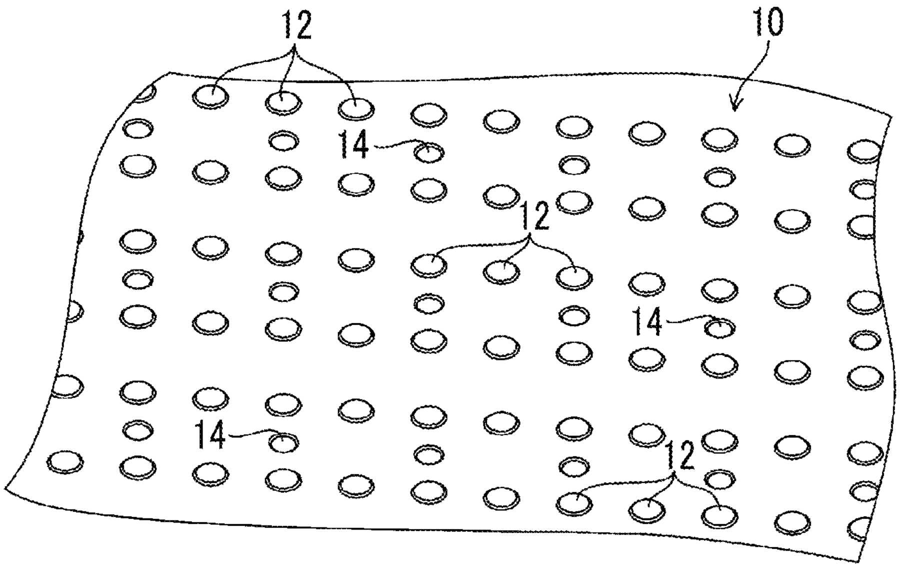
FIG. 1 is a schematic diagram showing an example of a guide surface.

The guide surface of the conveyance unit coming into contact with and supporting the recording medium during image formation may have an uneven shape. FIG. 1 is a schematic diagram showing an example of a guide surface 10 that supports the recording medium. The guide surface 10 shown in FIG. 1 comprises a plurality of projection portions 12 and a plurality of hole portions 14. The projection portion 12 has a cylindrical shape having a diameter of 1.0 mm and a height of 0.1 mm. The projection portions 12 are two-dimensionally disposed at regular intervals in a vertical direction and in a horizontal direction orthogonal to the vertical direction. The hole portion 14 is a through hole having a diameter of 1.0 mm that penetrates the guide surface 10. The hole portions 14 are two-dimensionally disposed at regular intervals in the vertical direction and the horizontal direction.

Figure 2:
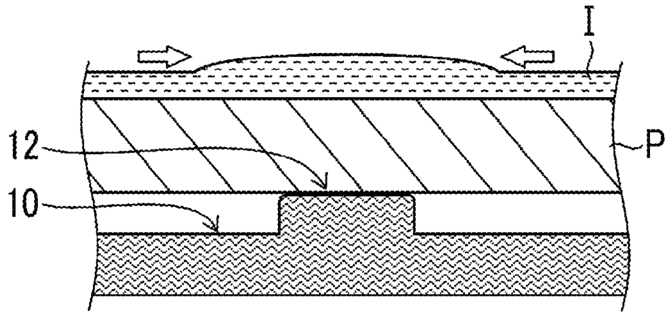
FIG. 2 is a cross-sectional view of the guide surface and paper.
Figure 3:
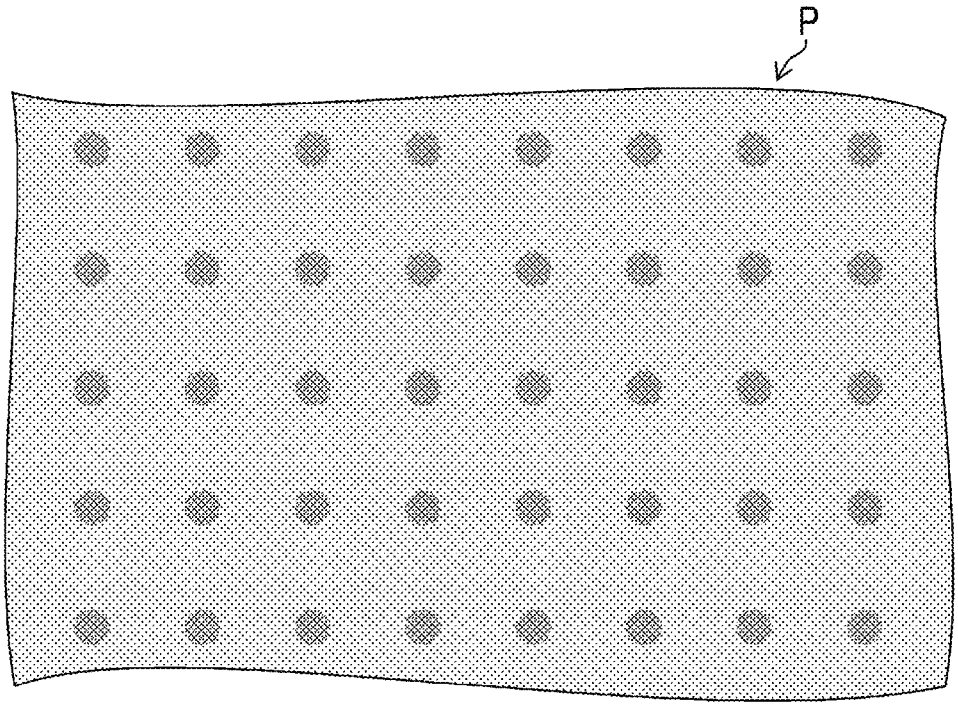
FIG. 3 is a top view of paper.

FIG. 2 is a cross-sectional view of the guide surface 10 and the paper Pin a case in which paper P onto which an ink I is applied is supported by the guide surface 10, and shows a change in surface tension due to permeation of the ink I and drying and concentration. FIG. 3 is a top view of the paper P and shows drying unevenness in a case in which the paper P on which a solid image is formed is supported by the guide surface 10 and dried. The solid image is an image in which a coverage with ink exceeds 100%. Here, a case in which a temperature of the guide surface 10 is relatively higher than a temperature of the paper P is considered.

Since a material having relatively high thermal conductivity as compared with the surrounding air is used for the guide surface 10, heat is likely to be transferred to a portion of the paper P in contact with the projection portion 12 (a position corresponding to the projection portion 12), and a temperature of the portion of the paper Pin contact with the projection portion 12 is locally increased. Therefore, the position of the paper P in contact with the projection portion 12 has a relatively high temperature with respect to a position of the paper P not in contact with the projection portion 12. Therefore, as shown in FIG. 2, in the ink I applied onto the paper P, drying and concentration is promoted at the position of the paper P in contact with the projection portion 12, and the surface tension is increased relative to the position of the paper P not in contact with the projection portion 12. This difference in surface tension causes the ink to move from the area where the surface tension is small to the area where the surface tension is large, and the ink is concentrated at the position of the paper P in contact with the projection portion 12.

As a result, as shown in FIG. 3, drying unevenness occurs in which a density of a part of the image is relatively high. In FIG. 3, a portion having a high density is emphasized. The portion having a relatively high density is a portion where the ink is concentrated. In the example shown in FIG. 3, a portion having a relatively high density is generated corresponding to the position of the projection portion 12, and each portion has a circular shape having a diameter of about 1.0 mm.

Figure 4:
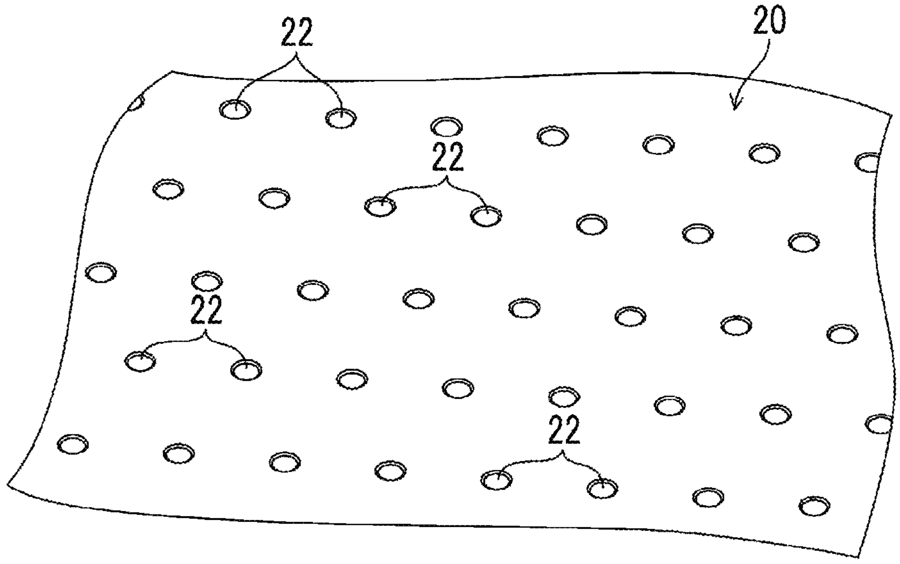
FIG. 4 is a schematic diagram showing an example of a guide surface.

In addition, the guide surface of the conveyance unit may have a plurality of hole portions. FIG. 4 is a schematic diagram showing an example of a guide surface 20 that supports the paper P. The guide surface 20 shown in FIG. 4 comprises a plurality of hole portions 22. The hole portion 22 is a through hole having a diameter of 0.5 mm that penetrates the guide surface 20. The hole portions 22 are two-dimensionally disposed at regular intervals in the vertical direction and the horizontal direction.

Figure 5:
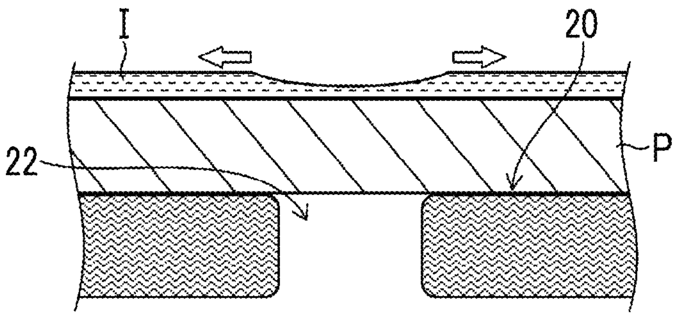
FIG. 5 is a cross-sectional view of the guide surface and paper.
Figure 6:
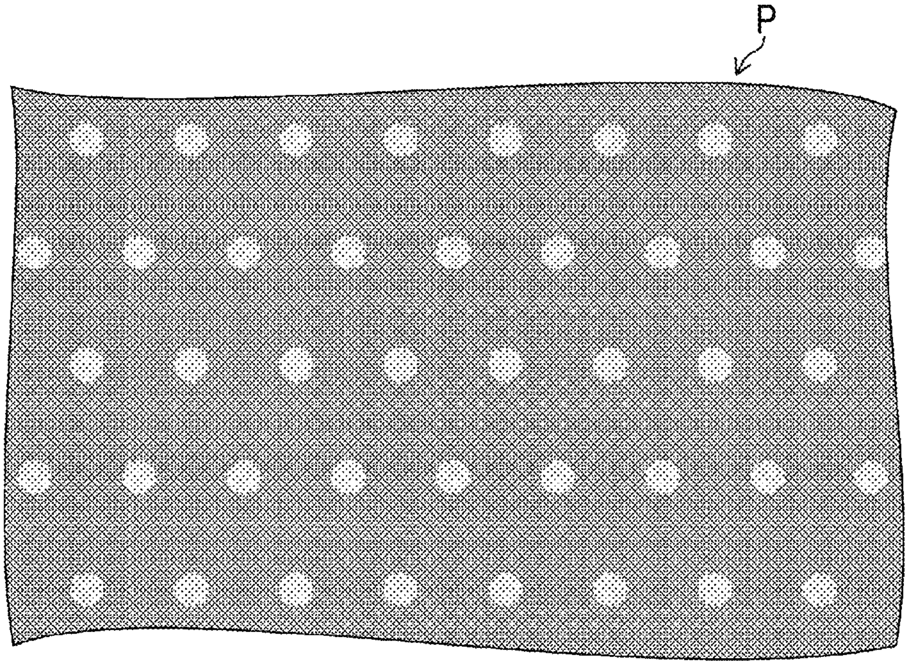
FIG. 6 is a top view of paper.

FIG. 5 is a cross-sectional view of the guide surface 10 and the paper Pin a case in which paper P onto which an ink I is applied is supported by the guide surface 10, and shows a change in surface tension due to permeation of the ink and drying and concentration. FIG. 6 shows drying unevenness in a case in which the paper P on which a solid image is formed is supported by the guide surface 10 and dried. Here, similarly, a case in which a temperature of the guide surface 10 is relatively higher than a temperature of the recording medium is considered.

Since thermal conductivity of the hole portion 22 (air existing in the hole portion 22) of the guide surface 20 is relatively low as compared with the material of the guide surface 20, heat is likely to be transferred to a portion of the paper P in contact with the air of the hole portion 22 (a position corresponding to the hole portion 22). Therefore, the position corresponding to the hole portion 22 of the paper P has a relatively low temperature with respect to the position of the paper P in contact with the guide surface 20. Therefore, as shown in FIG. 5, in the ink I applied onto the paper P, drying and concentration is not promoted at the position of the paper P in contact with the hole portion 22, and the surface tension is decreased relative to the position of the paper P in contact with the guide surface 20. This difference in surface tension causes the ink to move from the area where the surface tension is small to the area where the surface tension is large, and the ink at the position of the paper P corresponding to the hole portion 22 is diffused and reduced.

As a result, as shown in FIG. 6, drying unevenness occurs in which a color of a part of the image is lost white and the density is relatively low. In FIG. 6, a portion having a low density is emphasized. The portion having a relatively low density is a portion where the amount of the ink is low. In the example shown in FIG. 6, a portion having a relatively low density is generated corresponding to the position of the hole portion 22, and each portion has a circular shape having a diameter of about 0.5 mm.

In the related art, in a pre-step of applying the ink I, a treatment liquid was applied onto the paper P to increase a viscosity of the ink I, thereby suppressing fluidity. On the other hand, in a case in which an image is formed with the one-liquid ink without application of the treatment liquid, the ink I tends to move.

Both of guides having the guide surface 10 and the guide surface 20 are closely attached to the paper P for the purpose of conveying the paper P with high accuracy and sufficiently heat-transferring and drying the paper P, and are driven in the conveyance direction at substantially the same speed as the paper P. It is important to reduce visibility of the drying unevenness by devising the diameters and arrangements of the hole portions and the projection portions in order to suppress the drying unevenness while sufficiently fulfilling a role of conveyance drying in the related art. Hereinafter, a conveyance device and a printing device that reduce the visibility of the drying unevenness will be described.

In the following, a conveyance direction of the paper P is referred to as a paper conveyance direction, and a direction orthogonal to the paper conveyance direction and parallel to a paper surface of the paper P is referred to as a paper width direction.

Ink Jet Recording Device

Overall Configuration

Figure 7:
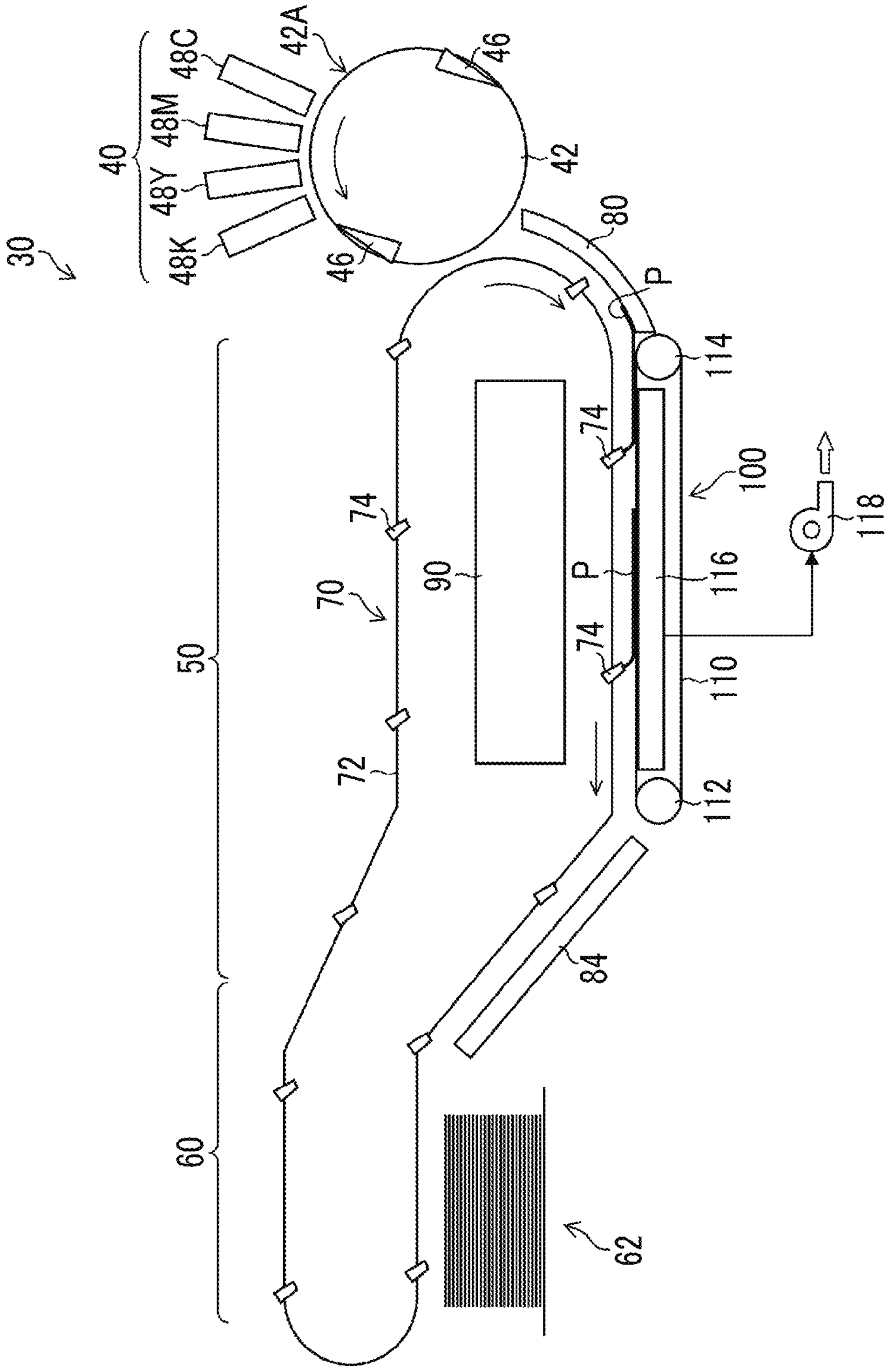
FIG. 7 is an overall configuration diagram showing a schematic configuration of an ink jet recording device.

FIG. 7 is an overall configuration diagram showing a schematic configuration of an ink jet recording device 30. The ink jet recording device 30 is a printing device that prints a color image on the sheet-fed paper P. The paper P is, for example, ordinary paper such as high-quality paper for copying. As shown in FIG. 7, the ink jet recording device 30 comprises a printing section 40, a drying section 50, and a stacking section 60.

Printing Section

The printing section 40 (an example of a "first conveyance device") comprises a printing drum 42 and ink jet heads 48C, 48M, 48Y, and 48K. The printing section 40 executes printing by adhering ink to the paper P supplied from a paper feeding section (not shown).

The printing drum 42 comprises a gripper 46 (an example of a "holding member" and an example of a "first holding member") on an outer peripheral surface 42A. The gripper 46 is a holding member that grips a leading end part of the paper P. The leading end part of the paper P is an end part of the paper P on a downstream side in the paper conveyance direction. The gripper 46 comprises a plurality of gripping claws arranged along an axial direction of the printing drum 42. The plurality of gripping claws are supported to be openable and closable by using a claw support member (not shown). The plurality of gripping claws are disposed at intervals in the axial direction of the printing drum 42, and grip the paper P at a plurality of locations in the paper width direction.

In the printing drum 42, the grippers 46 are disposed at two positions on the outer peripheral surface 42A, approximately at 180 degrees equidistant positions. That is, the printing drum 42 can convey two sheets of the paper P in one rotation. Depending on a diameter of the printing drum 42, it is also possible to convey three or more sheets of the paper P in one rotation.

Figure 12:
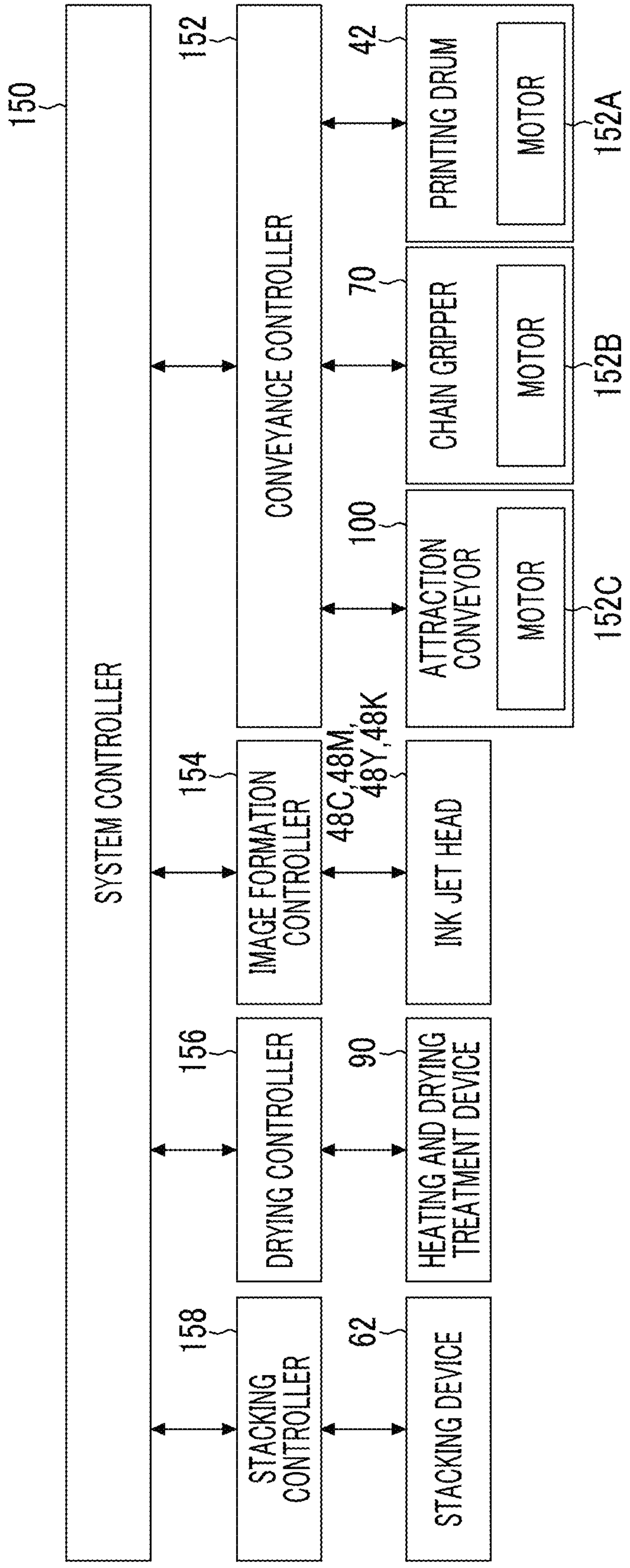
FIG. 12 is a functional block diagram of a control system of the ink jet recording device.

The printing drum 42 is rotated by power of a motor 152A (see FIG. 12). That is, the printing drum 42 is rotated by gripping the leading end of the paper P using the gripper 46, and conveys the paper P integrally with the outer peripheral surface 42A by winding the paper P around the outer peripheral surface 42A and supporting a non-printing surface (an example of "a second surface that is a surface opposite to the first surface") of the paper P, by the outer peripheral surface 42A. The printing drum 42 comprises an attraction mechanism (not shown) to attract the paper P wound around the outer peripheral surface 42A, to the outer peripheral surface 42A.

Negative pressure is used for the attraction. The printing drum 42 sucks the paper P from an inside via a hole portion 44B (see FIG. 9) of the outer peripheral surface 42A to attract the paper P to the outer peripheral surface 42A. Static electricity may be used for the attraction. In this case, the printing drum 42 is charged to perform the attraction.

The ink jet heads 48C, 48M, 48Y, and 48K are liquid jetting heads that jet inks (an example of "liquid") of cyan (C), magenta (M), yellow (Y), and black (K), respectively, by an ink jet method. The ink jet heads 48C, 48M, 48Y, and 48K are disposed at regular intervals along a conveyance path of the paper P using the printing drum 42.

Here, a configuration in which four colors of inks of cyan, magenta, yellow, and black are used is exemplified, but the combination of the ink colors and the number of the colors are not limited to the present embodiment, and light ink, dark ink, and special color ink may be added as necessary.

By jetting an ink from at least one of the ink jet heads 48C, 48M, 48Y, and 48K toward the paper P to be conveyed by the printing drum 42, an ink is applied onto a printing surface (an example of a "first surface") of the paper P to form an image. In this way, the paper P on which the image is formed by the printing section 40 is delivered from the gripper 46 of the printing drum 42 to the drying section 50.

Drying Section

The drying section 50 (an example of a "second conveyance device") executes a drying treatment on the paper P on which the image is formed by the printing section 40. The drying section 50 comprises a chain gripper 70, a first guide 80, a second guide 84, a heating and drying treatment device 90, and an attraction conveyor 100.

The chain gripper 70 (an example of a "second conveyance device") comprises a pair of endless chains 72 and a plurality of grippers 74. FIG. 7 illustrates only one of the pair of chains 72. Each chain 72 is wound around two sprockets (not shown), and the chain 72 circulates in a clockwise direction in FIG. 7 as the sprocket is rotated by a motor 152B (see FIG. 12). The term "circulate" is synonymous with circular movement.

The plurality of grippers 74 (an example of a "holding member" and an example of a "second holding member") are attached to the chain 72 at predetermined intervals in the circumferential direction of the chain 72. One end part and the other end part of each gripper 74 in the paper width direction (paper surface depth direction in FIG. 7) are attached to the pair of chains 72, respectively. Each gripper 74 comprises a plurality of grip claws arranged along the paper width direction. The plurality of grip claws are attached to be openable and closable using a claw support member (not shown) passed between two chains 72. These plurality of grip claws grip the leading end part of the paper P.

The chain gripper 70 receives the paper P from the printing drum 42, grips the leading end part of the paper P by the gripper 74, and conveys the paper P. In the conveyance path of the paper P by the chain gripper 70, the first guide 80, the attraction conveyor 100, and the second guide 84 are disposed in order from an upstream side in the paper conveyance direction facing the chain 72.

The first guide 80 is a mechanism that guides the paper Pin a region between the printing drum 42 and the attraction conveyor 100 in the conveyance path of the paper P. The first guide 80 has a length along the paper width direction.

The attraction conveyor 100 is a conveyance unit that conveys the paper P by causing an endless conveying belt 110 travel in a state in which the paper P is attracted to the conveying belt 110 in a region between the first guide 80 and the second guide 84 in the conveyance path of the paper P.

The second guide 84 is a mechanism that guides the paper P in a region between the attraction conveyor 100 and the stacking section 60 in the conveyance path of the paper P. The second guide 84 has a length along the paper width direction.

The heating and drying treatment device 90 is disposed to face the attraction conveyor 100. The heating and drying treatment device 90 is a drying mechanism that heats the paper P onto which the ink is applied by the ink jet heads 48C, 48M, 48Y, and 48K to evaporate a solvent of the ink and dry the paper P. The heating and drying treatment device 90 comprises a blower unit (not shown). The blower unit includes a heater and a fan, and blows hot air onto the paper P to be conveyed using the chain gripper 70 and the attraction conveyor 100.

The heating and drying treatment device 90 may include an exhaust device (not shown). The exhaust device discharges air in a treatment region of the heating and drying treatment device 90 to an outside of the ink jet recording device 30. Thereby, a temperature rise in the ink jet recording device 30 due to retention of heat is suppressed.

The chain gripper 70 conveys the paper P that has passed through the drying treatment by the heating and drying treatment device 90, to the stacking section 60. The chain gripper 70 opens the gripper 74 to release the paper P in a case in which the paper P reaches the stacking section 60.

Stacking Section

The stacking section 60 comprises a stacking device 62 that stacks the paper P. The stacking device 62 receives the paper P released from the chain gripper 70, and stacks the paper P in a bundle on a stacking tray of the stacking device 62.

Printing Drum

Figure 8:
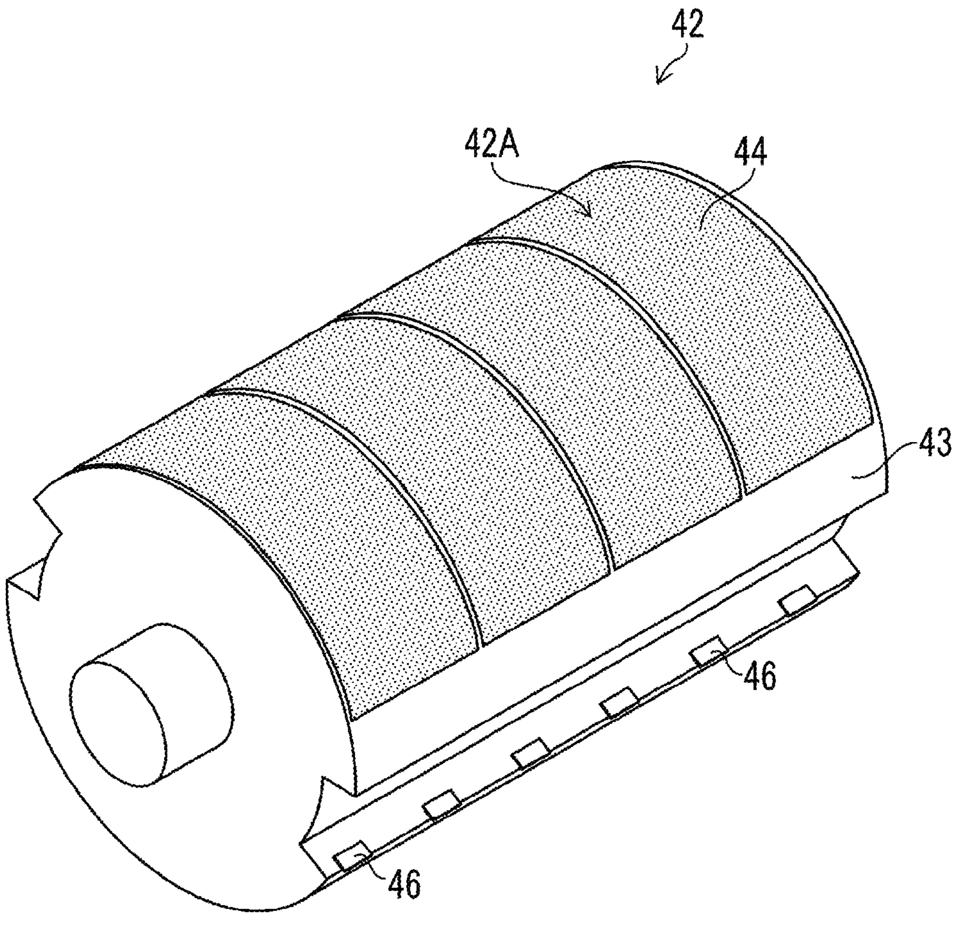
FIG. 8 is a perspective view showing a configuration of a printing drum.

FIG. 8 is a perspective view showing a configuration of the printing drum 42. As shown in FIG. 8, the printing drum 42 (an example of a "guide member" and an example of a "first guide member") has the outer peripheral surface 42A (an example of a "guide surface" and an example of a "first guide surface") formed by attaching a ceramic jacket 44 to a peripheral surface of a cylindrical drum main body 43.

Figure 9:
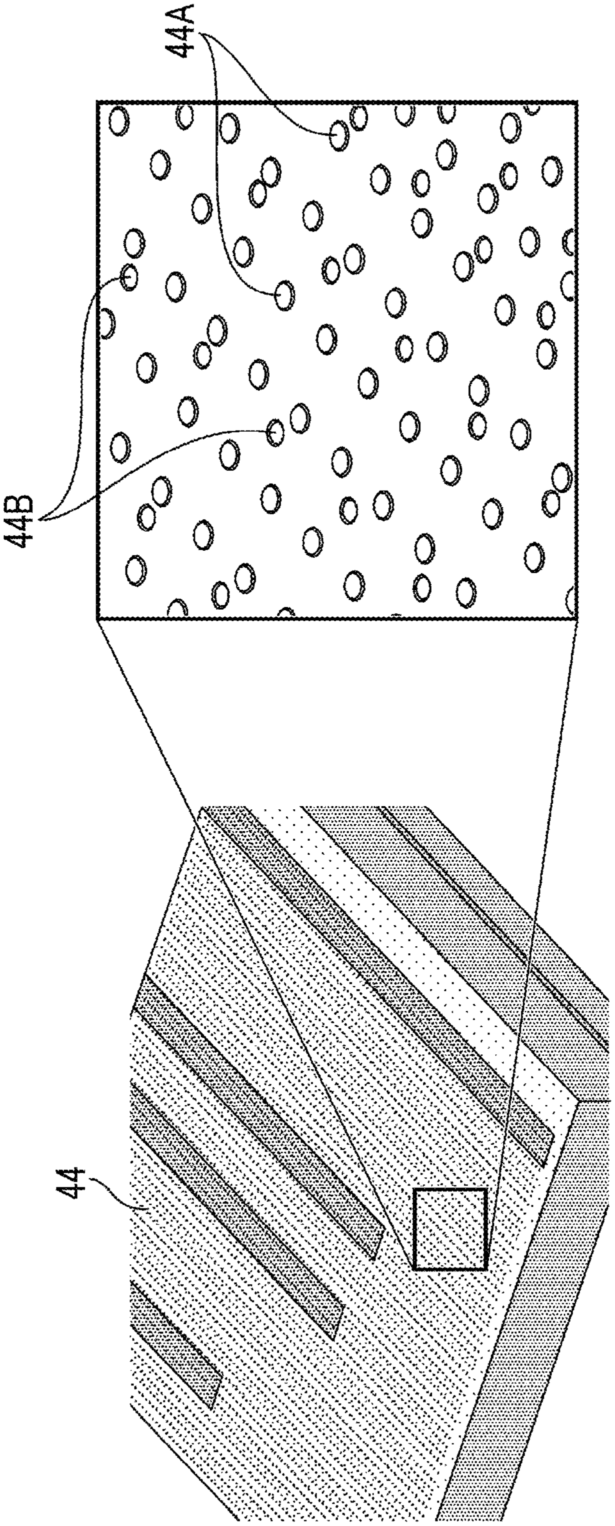
FIG. 9 is a perspective view and a partially enlarged view of a ceramic jacket.

FIG. 9 is a perspective view and a partially enlarged view of the ceramic jacket 44. As shown in FIG. 9, the ceramic jacket 44 has a large number of projection portions 44A and hole portions 44B.

The projection portion 44A prevents an occurrence of wrinkling of the paper P wound around the outer peripheral surface 42A of the printing drum 42. The projection portion 44A (an example of a "first projection portion") has a cylindrical shape having a diameter of 0.3 mm and a height of 0.1 mm. The plurality of projection portions 44A are disposed in a row at regular intervals in a first direction to form a projection portion row. In addition, a plurality of the projection portion rows are disposed at regular intervals in a second direction orthogonal to the first direction. The projection portions 44A may be squarely arranged or staggered. A distance (pitch) between centers of the adjacent projection portions 44A forming the projection portion row is 2.5 mm to 3 mm. A proportion per unit area of the projection portions 44A on a surface of the ceramic jacket 44 is in a range of 3.8% to 12.6%.

The hole portion 44B (an example of a "first hole portion") sucks the paper P wound around the outer peripheral surface 42A of the printing drum 42. The hole portion 44B is a through hole that penetrates the ceramic jacket 44. The hole portion 44B has, for example, a diameter of 0.3 mm. A plurality of the hole portions 44B are disposed in a row at regular intervals in the first direction to form a hole portion row. In addition, a plurality of the hole portion rows are disposed at regular intervals in the second direction. The hole portions 44B may be squarely arranged or staggered. A distance (pitch) between centers of the adjacent hole portions 44B forming the hole portion row is 4.5 mm to 5 mm. An opening ratio per unit area of the hole portions 44B on the surface of the ceramic jacket 44 is in a range of 2.0% to 2.5%.

Chain Gripper and Attraction Conveyor

Figure 10:
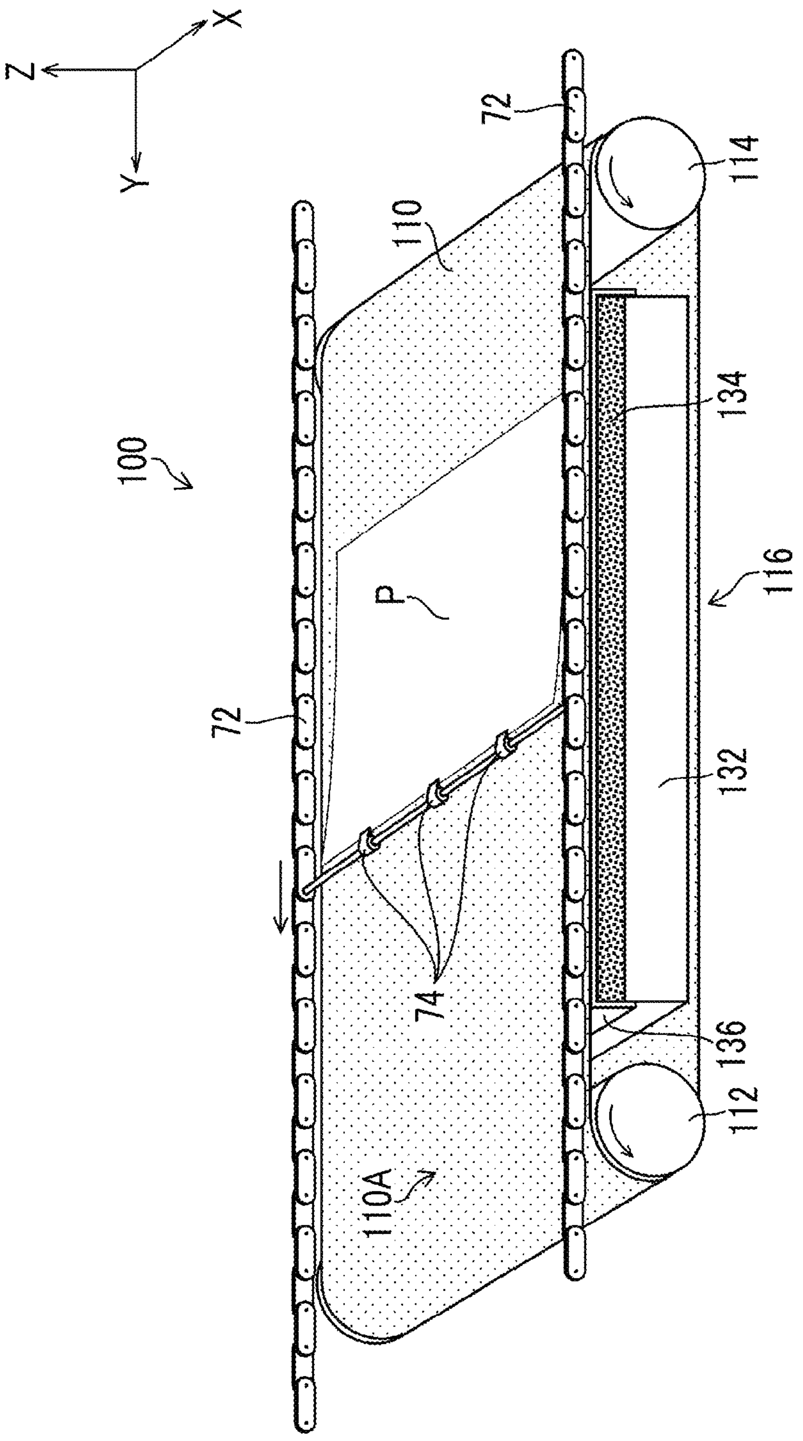
FIG. 10 is a perspective view showing a configuration example of a chain gripper and an attraction conveyor.

FIG. 10 is a perspective view showing a configuration example of the chain gripper 70 and the attraction conveyor 100. As shown in FIG. 10, the chain gripper 70 comprises the pair of endless chains 72 and the plurality of grippers 74. In addition, the attraction conveyor 100 comprises the conveying belt 110, a drive pulley 112, a driven pulley 114, and an attraction unit 116.

The conveying belt 110 (an example of a "guide member" and an example of a "second guide member") has an endless shape (annular shape). The conveying belt 110 has a belt width larger than a paper width of the paper P. The conveying belt 110 is preferably made of metal from the viewpoint of durability. As the conveying belt 110, for example, a steel use stainless 304 (SUS304) belt having a thickness of 0.3 mm can be used.

Figure 11:
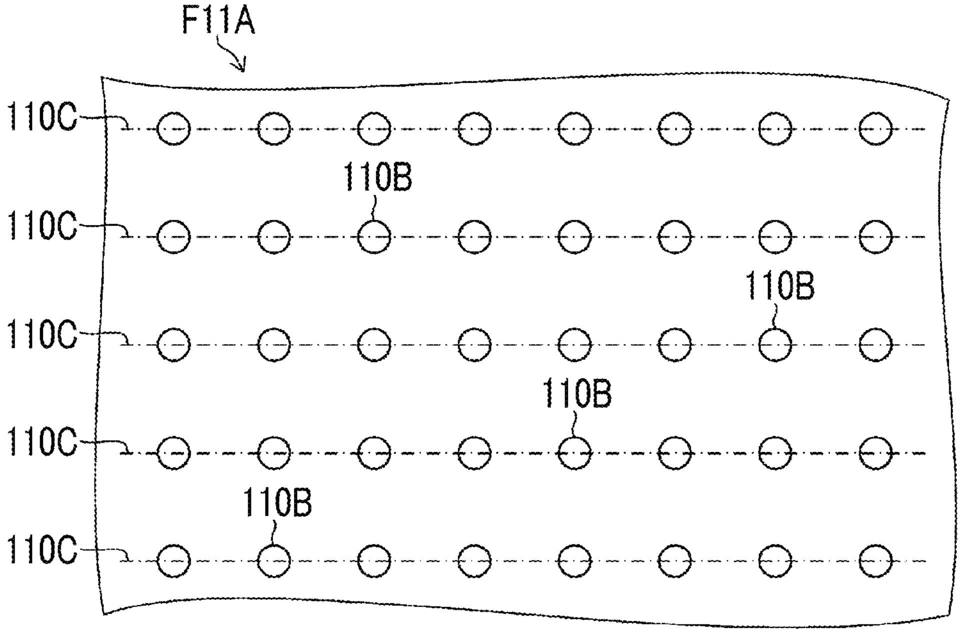
FIG. 11 is a diagram showing an arrangement of hole portions in a conveying belt.
Figure 11:
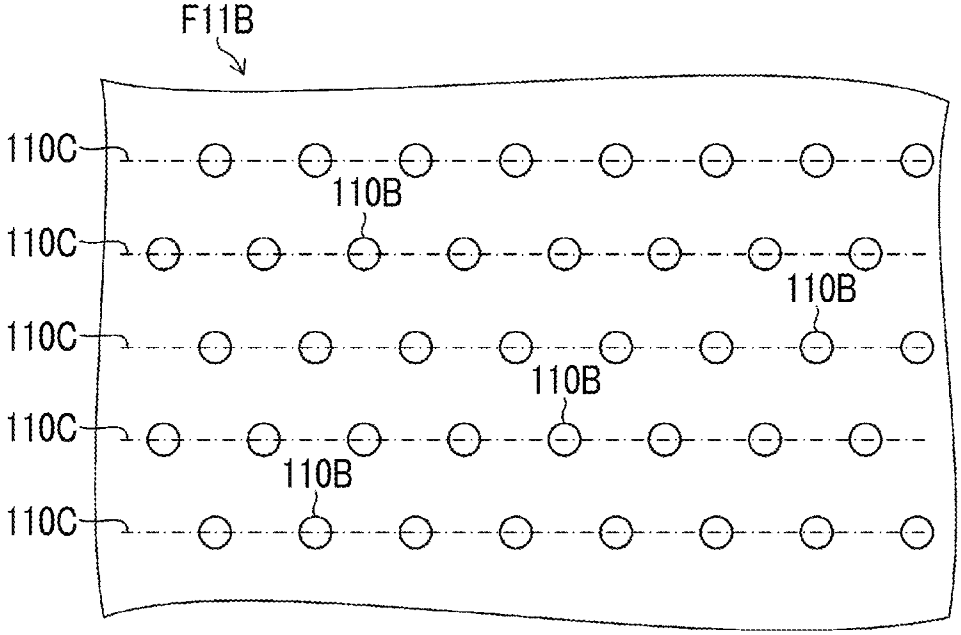

A conveying surface 110A (an example of a "guide surface" and an example of a "second guide surface") of the conveying belt 110 has a large number of hole portions 110B (see FIG. 11). The hole portion 110B (an example of a "second hole portion") is a through hole having a diameter of 0.3 mm that penetrates the conveying belt 110. The hole portions 110B may be squarely arranged or zigzag arranged. A distance (pitch) between centers of the adjacent hole portions 110B is 4.5 mm to 5 mm. An opening ratio per unit area of the hole portions 110B is preferably in a range of 3% to 9%, and is about 5% in the present embodiment. The conveying surface 110A of the conveying belt 110 may have a large number of projection portions (an example of a "second projection portion").

The drive pulley 112 is disposed on the downstream side in the paper conveyance direction with respect to the driven pulley 114. The drive pulley 112 and the driven pulley 114 are disposed in parallel to each other. The conveying belt 110 is stretched between the drive pulley 112 and the driven pulley 114. The drive pulley 112 is rotationally driven by a motor 152C (see FIG. 12) as a power source. In a case in which the motor is driven, the drive pulley 112 rotates counterclockwise in FIG. 10.

The driven pulley 114 is driven by the rotation of the drive pulley 112 and rotates counterclockwise in FIG. 10. The rotation of the drive pulley 112 and the rotation of the driven pulley 114 cause the conveying belt 110 to travel between the drive pulley 112 and the driven pulley 114 in the conveyance direction.

The paper P to be conveyed by the chain gripper 70 is placed on the conveying surface 110A of the conveying belt 110. The attraction conveyor 100 conveys the paper Pin the paper conveyance direction by supporting a non-printing surface of the paper P having a printing surface onto which the ink applied, by the conveying surface 110A of the conveying belt 110, and causing the conveying belt 110 to travel. That is, the paper P is conveyed by the chain gripper 70 and the attraction conveyor 100 in a state in which the leading end part is gripped by the gripper 74 and the non-printing surface is attracted to the conveying belt 110 on a trailing end side with respect to the gripped leading end part. The conveying surface 110A forms a flat surface at least while abutting on a back surface of the paper P.

The chain 72 and the gripper 74 of the chain gripper 70 move at a position where a distance to the conveying surface 110A of the conveying belt 110 is 5 mm or more and 10 mm or less. In a case in which the distance between the gripper 74 and the conveying surface 110A is too large, the leading end part of the paper P gripped by the gripper 74 is greatly bent, which may cause wrinkling. It is preferable that the distance between the gripper 74 gripping the paper P and the conveying surface 110A is as short as possible.

The attraction unit 116 is disposed inside the conveying belt 110. The attraction unit 116 is connected to a blower 118 for sucking air (see FIG. 7), and, by operating the blower 118, negative pressure for sucking the paper P is generated through the hole portion 110B of the conveying belt 110. The attraction unit 116 comprises a chamber 132, a porous attraction plate 134, and a wear resistant sheet 136.

The chamber 132 has a rectangular shape in which a surface facing the conveying belt 110 is open. The shape of the chamber 132 is not limited to the rectangular shape, and need only be a box shape. The porous attraction plate 134 formed of a porous body is disposed on the open surface of the chamber 132. The porous attraction plate 134 is formed of a porous body, which allows ventilation in a thickness direction (Z direction in FIG. 10). That is, the porous attraction plate 134 has a large number of communication holes (not shown) through which air passes.

An upper surface of the porous attraction plate 134 is formed to be flat, and the wear resistant sheet 136 is disposed thereon. The wear resistant sheet 136 is provided with a plurality of attracting holes (not shown) for attracting the paper P via the conveying belt 110. The wear resistant sheet 136 is, for example, a member made of glass cloth having a coating layer of a fluororesin. The wear resistant sheet 136 is located at the uppermost part of the attraction unit 116 and moves slidingly on the conveying belt 110.

In the porous attraction plate 134, the chamber 132 side communicates with the wear resistant sheet 136 side through a large number of communication holes. The porous attraction plate 134 is preferably made of a resin, a ceramic such as aluminum oxide, or a silicon carbide (SiC)-based material from the viewpoint of durability, and is preferably made of a fluororesin, a ceramic, or a silicon carbide-based material from the viewpoint of heat resistance.

The chain gripper 70 conveys the paper P in the drying section 50 in cooperation with the attraction conveyor 100. The conveying belt 110 moves in synchronization with the movement of the chain 72. A traveling speed of the conveying belt 110 and a traveling speed of the chain gripper 70 are controlled to be substantially the same speed.

FIG. 11 is a diagram showing an arrangement of the hole portions 110B of the conveying belt 110. F11A in FIG. 11 shows the hole portions 110B that are squarely arranged. As shown in F11A, the hole portions 110B are disposed in a third direction at regular intervals to form a hole portion row 110C along the third direction, and a plurality of the hole portion rows 110C are disposed at regular intervals in a fourth direction. For example, the third direction is the paper width direction, and the fourth direction is the paper conveyance direction. Here, the hole portions 110B are disposed such that a distance between the hole portions 110B adjacent to each other in the third direction and a distance between the hole portions 110B adjacent to each other in the fourth direction are equal to each other.

F11B in FIG. 11 shows the hole portions 110B that are zigzag arranged. As shown in F11B, the hole portions 110B are disposed in the third direction at regular intervals to form a hole portion row 110C along the third direction, and a plurality of the hole portion rows 110C are disposed at regular intervals in the fourth direction. In addition, the hole portion rows 110C adjacent to each other in the fourth direction are disposed such that positions of the hole portions 110B in the third direction are shifted by half an interval between the hole portions 110B in the third direction. For example, the third direction is the paper width direction, and the fourth direction is the paper conveyance direction. Here, the hole portions 110B are disposed such that a distance between the hole portions 110B adjacent to each other in the third direction and a distance from the nearest hole portion 110B in the adjacent hole portion row are equal to each other.

Configuration of Control System

FIG. 12 is a functional block diagram of a control system of the ink jet recording device 30. The ink jet recording device 30 comprises a system controller 150, a conveyance controller 152, an image formation controller 154, a drying controller 156, and a stacking controller 158.

The system controller 150 is an overall controller that collectively controls each unit of the ink jet recording device 30. The system controller 150 is an operation unit that performs various types of operation processing. The system controller 150 is a memory controller that controls reading and writing of data in a memory.

The conveyance controller 152 controls driving of the motor 152A (an example of a "drive mechanism" and an example of a "first drive mechanism") of the printing drum 42, the motor 152B of the chain gripper 70, and the motor 152C (an example of a "drive mechanism" and an example of a "second drive mechanism") of the attraction conveyor 100.

The image formation controller 154 controls the operations of the ink jet heads 48C, 48M, 48Y, and 48K in response to a command from the system controller 150. In addition, the image formation controller 154 comprises an image processing unit (not shown). The image processing unit forms dot data from input image data. The image processing unit comprises a color separation processing unit (not shown), a color conversion processing unit (not shown), a correction processing unit (not shown), and a halftone processing unit (not shown).

The color separation processing unit executes color separation processing on the input image data. For example, in a case in which the input image data is represented by red, green, blue (RGB), the input image data is separated into data for each of R, G, and B.

The color conversion processing unit converts the image data for each color separated into R, G, and B into C, M, Y, and K corresponding to the ink colors.

The correction processing unit executes correction processing on the image data for each color converted into C, M, Y, and K. Examples of the correction processing include gamma-correction processing, density unevenness correction processing, and abnormality recording element correction processing.

The halftone processing unit converts the image data represented by a multi-gradation number in a range of, for example, 0 to 255 into dot data represented by a binary value or a multi-value which is a ternary value or more and is less than a gradation number of the input image data. The halftone processing unit applies a predetermined halftone processing rule. Examples of the halftone processing rule include a dithering method and an error diffusion method.

The image formation controller 154 comprises a waveform generation unit (not shown), a waveform storage unit (not shown), and a drive circuit (not shown). The waveform generation unit generates a waveform of a drive voltage. The waveform storage unit stores the waveform of the drive voltage.

The drive circuit generates a drive voltage having a drive waveform corresponding to the dot data. The drive circuit supplies the drive voltage to the ink jet heads 48C, 48M, 48Y, and 48K.

That is, a jetting timing and an ink jetting amount at each pixel position are determined based on the dot data generated through the processing by the image processing unit. A drive voltage corresponding to the jetting timing and the ink jetting amount at each pixel position, and a control signal for determining the jetting timing at each pixel are generated. The drive voltage and the control signal are supplied to the ink jet heads 48C, 48M, 48Y, and 48K, and dots are formed on the paper P by the ink jetted from the ink jet heads 48C, 48M, 48Y, and 48K.

The drying controller 156 controls the operation of the heating and drying treatment device 90 in response to a command from the system controller 150.

The stacking controller 158 controls the operation of the stacking device 62 in response to a command from the system controller 150. The operation of the stacking device 62 may include the opening and closing operation of the gripper 74 in a case in which the stacking device 62 stacks the image-formed paper P.

Hardware Configuration of Various Controllers

A processor is applied to the various controllers shown in FIG. 12. The hardware structure of the processor is various processors as described below. The various processors include a central processing unit (CPU) that is a general-purpose processor acting as various functional units by executing software (program), a graphics processing unit (GPU) that is a processor specialized in image processing, a programmable logic device (PLD) that is a processor of which a circuit configuration is changeable after manufacturing, such as a field programmable gate array (FPGA), a dedicated electric circuit that is a processor having a circuit configuration dedicatedly designed to execute a specific process, such as an application specific integrated circuit (ASIC), or the like.

One processing unit may be configured of one of these various processors, or may be configured of two or more processors of the same type or different types (for example, a plurality of FPGAs, a combination of a CPU and an FPGA, or a combination of a CPU and a GPU). Further, a plurality of functional units may be configured of one processor. As an example in which the plurality of functional units are configured of one processor, first, as typified by a computer such as a client or a server, one processor is configured of a combination of one or more CPUs and software and this processor acts as the plurality of functional units. Second, as typified by a system on chip (SoC) or the like, a processor that realizes the functions of the entire system including the plurality of functional units with one integrated circuit (IC) chip is used. As described above, the various functional units are configured by using one or more of the above described various processors as a hardware structure.

More specifically, the hardware structure of these various processors is an electric circuit (circuitry) in which circuit elements such as semiconductor elements are combined.

The processor executes an instruction stored in a memory (not shown). The memory stores an instruction to be executed by the processor. The memory includes a random access memory (RAM) (not shown) and a read only memory (ROM). The processor uses the RAM as a work area, executes software using various programs and parameters including an investigation support program stored in the ROM, and executes various processes by using parameters stored in the ROM or the like.

Action of Ink Jet Recording Device

The ink jet recording device 30 grips the paper P with the gripper 46 of the printing drum 42 and conveys the paper P integrally with the outer peripheral surface 42A by supporting the paper P by the outer peripheral surface 42A of the printing drum 42. The ink jet recording device 30 forms an image by jetting the ink from the ink jet heads 48C, 48M, 48Y, and 48K onto the paper P to be conveyed by the printing drum 42.

Further, the ink jet recording device 30 grips the paper P on which the image is formed with the gripper 74 and conveys the paper P along the conveyance path of the chain gripper 70. The non-printing surface of the paper P is guided by the first guide 80, the attraction conveyor 100, and the second guide 84. The ink jet recording device 30 dries the ink applied onto the paper P by the heating and drying treatment device 90 while conveying the paper P.

Finally, the ink jet recording device 30 stacks the paper P on which the ink has been dried in the stacking device 62.

Reduction of Visibility of Drying Unevenness

In the present embodiment, the drying unevenness refers to a phenomenon in which a part of an image appears dark and a phenomenon in which a color is lost and the image appears white and faint. In this embodiment, the following measures are taken in order to reduce the visibility of the drying unevenness.

Diameter of Hole Portion and Projection Portion

In a case in which hole portions or projection portions are present on a guide surface of a conveyance unit that conveys paper onto which the liquid is applied, a size of the drying unevenness is reduced by making diameters of the hole portions and the projection portions relatively small, thereby reducing visibility. In the ink jet recording device 30, the projection portion on the guide surface refers to the projection portion 44A on the outer peripheral surface 42A of the printing drum 42, and the hole portion on the guide surface refers to the hole portion 110B of the conveying surface 110A of the conveying belt 110. The hole portion on the guide surface may refer to the hole portion 44B on the outer peripheral surface 42A of the printing drum 42.

Figure 13:
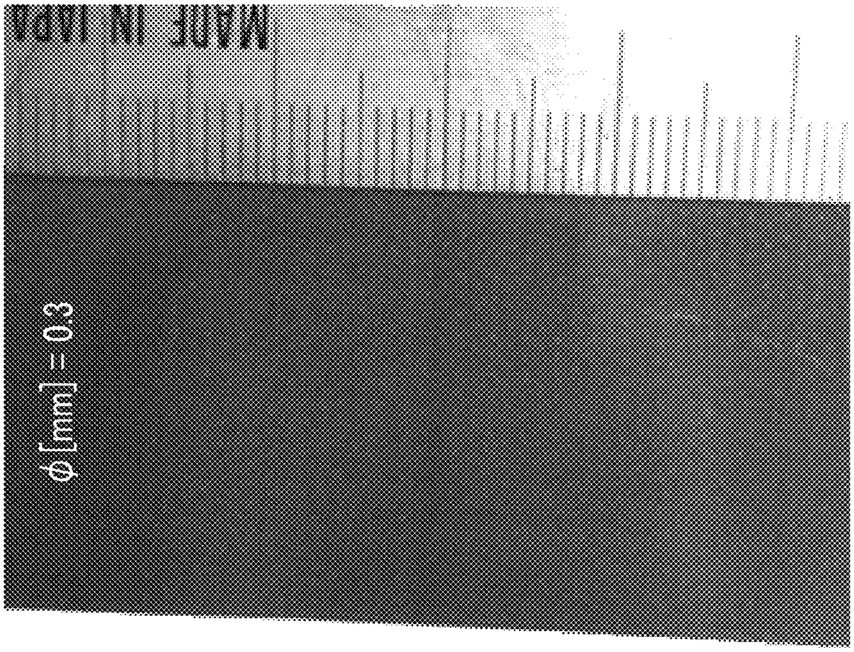
FIG. 13 is an image for comparing visibility of drying unevenness in a solid image.
Figure 13:
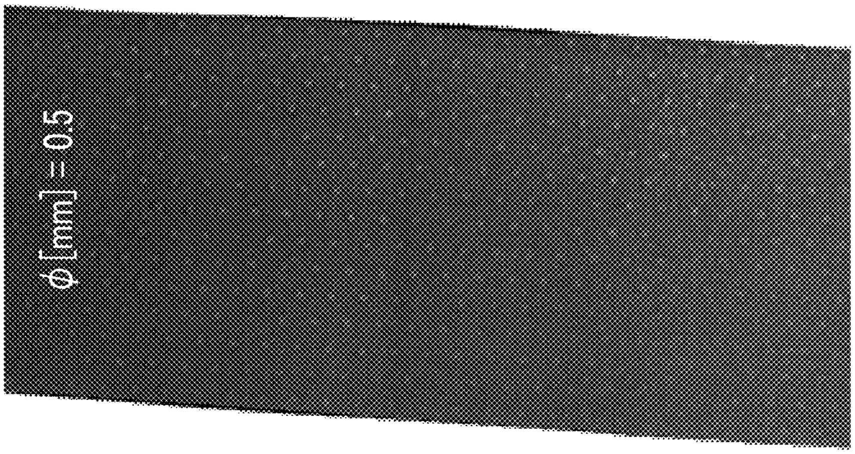

FIG. 13 is an image for comparing the visibility of drying unevenness in a solid image printed and dried by the ink jet recording device 30. F13A of FIG. 13 is an image showing drying unevenness in a solid image in a case in which a diameter of the hole portion 110B of the conveying belt 110 is 0.5 mm, and F13B of FIG. 13 is an image showing drying unevenness in a solid image in a case in which the diameter of the hole portion 110B of the conveying belt 110 is 0.3 mm. As shown in FIG. 13, by setting the diameter of the hole portion 110B to 0.3 mm, it is possible to reduce the visibility of the phenomenon in which a color is lost and the hole appears white and faint as compared with the case in which the diameter of the hole portion 110B is 0.5 mm.

FIG. 14 is a table showing evaluation results of drying unevenness visibility and conveyability with respect to the diameters of the projection portion 44A of the printing drum 42 and the hole portion 110B of the conveying belt 110. Evaluation conditions are such that the projection portions 44A are disposed in a square manner, and a distance between centers of the adjacent projection portions 44A is 2.5 mm in both the paper width direction and the paper conveyance direction. In addition, the hole portions 110B are disposed in a square manner, and a distance between centers of the adjacent hole portions 110B is 1.0 mm in the paper width direction and 1.25 mm in the paper conveyance direction.

The visibility of the drying unevenness was classified as follows. Classifications A, B, and C represent acceptable levels, and classification D represents an acceptable level.

A: Very good (no drying unevenness is visible).

B: Worse than A and better than C.

C: Good (almost no drying unevenness is visible).

D: Bad (drying unevenness is visible).

The conveyability was classified as follows. Classifications A, B, and C represent acceptable levels, and classification D represents an acceptable level.

A: Very good (can be satisfactorily conveyed).

B: Worse than A and better than C.

C: Good (can be conveyed).

D: Bad (has trouble in conveyance).

As shown in FIG. 14, in a case in which the diameter of the hole portion 110B is 0.01 mm, the drying unevenness is not visible, but the conveyance was hindered. In a case in which the diameter of the hole portion 110B is 0.011 mm to 0.31 mm, both the visibility of the drying unevenness and the conveyability are acceptable. In addition, in a case in which the diameter of the hole portion 110B is 0.5 mm, the conveyability is good, but the drying unevenness is visible. As described above, it was found that the diameter of the hole portion 110B is preferably in a range of 0.011 mm to 0.31 mm.

The hole portion 110B is used for the purpose of attracting the paper P. It is desirable that the diameter of the hole portion 110B is larger than 0.01 mm from a pore diameter of a typical porous sheet polytetrafluoroethylene (PTFE). In a case in which the diameter of the hole portion 110B is excessively small, the air permeation resistance is lowered, and the conveyability is impaired.

In addition, as shown in FIG. 14, in a case in which the diameter of the projection portion 44A is 0.01 mm and 0.011 mm, the drying unevenness is not visible, but the conveyance was hindered. In a case in which the diameter of the projection portion 44A is 0.1 mm to 0.31 mm, both the visibility of the drying unevenness and the conveyability are acceptable. In addition, in a case in which the diameter of the projection portion 44A is 0.5 mm, the conveyability is good, but the drying unevenness is visible.

The projection portion 44A is used for the purpose of gripping the paper P. In a case in which the projection portion diameter is excessively small, the grip force is lowered, and the conveyability is impaired. As described above, it was found that the diameter of the projection portion 44A is preferably in a range of 0.1 mm to 0.31 mm.

Here, although the case in which upper surfaces of the hole portion and the projection portion in contact with the paper P are circular has been described, the upper surfaces of the hole portion and the projection portion may have a polygonal shape or any other shape. In a case in which the upper surface of the hole portion 110B is not circular, a diameter of an inscribed circle inscribed in the upper surface of the hole portion 110B need only be in a range of 0.011 mm to 0.31 mm. In addition, in a case in which the upper surface of the projection portion 44A is not circular, a diameter of an inscribed circle inscribed in the upper surface of the projection portion 44A need only be in a range of 0.1 mm to 0.31 mm.

Periodicity of Hole Portion Row and Projection Portion Row

In a case in which a guide surface having a projection portion and a guide surface having a hole portion are present at different areas in the conveyance unit that conveys the paper onto which the liquid is applied, "a phenomenon in which a part of an image appears dark" and "a phenomenon in which a part of an image appears faint" are visible on one image.

In the ink jet recording device 30 according to the present embodiment, the printing drum 42 is provided with the projection portion 44A, and the conveying belt 110 is provided with the hole portion 110B. That is, a guide surface having a projection portion and a guide surface having a hole portion are present at different areas in the ink jet recording device 30.

As described with reference to FIG. 11, the hole portions 110B of the conveying belt 110 form a hole portion row. A direction in which the hole portion row extends is, for example, the paper width direction. Similarly, the projection portions 44A of the printing drum 42 also form a projection portion row.

In a case in which the projection portion row of the projection portions 44A of the printing drum 42 extends in the paper width direction, the "phenomenon in which a part of an image appears dark" may appear as a line in the paper width direction. In addition, in a case in which the hole portion row of the hole portions 110B of the conveying belt 110 extends in the paper width direction, the "phenomenon in which a part of an image appears faint" may appear as a line in the paper width direction. Here, in a case in which the line of the "phenomenon in which a part of an image appears dark" is inserted between the lines of the "phenomenon in which a part of an image appears faint", it becomes more visible because of a periodic difference in shading.

Figure 15:
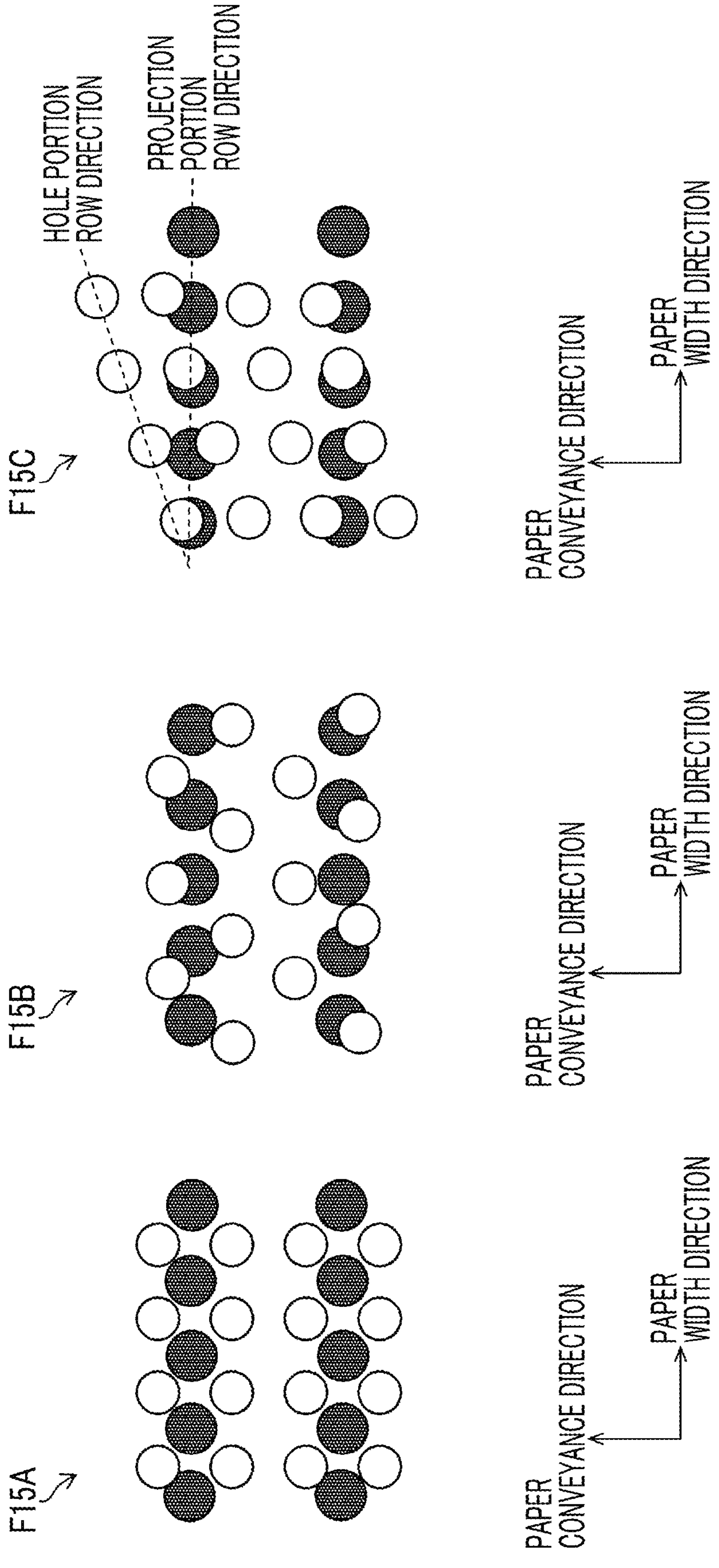
FIG. 15 is a schematic diagram of a method of visually recognizing drying unevenness on paper by disposition of projection portions and hole portions.

FIG. 15 is a schematic diagram of a method of visually recognizing the drying unevenness on the paper P by disposition of the projection portions and the hole portions. In FIG. 15, a white circle indicates a position of a phenomenon in which an image is visually recognized faintly because of the drying unevenness, and a black circle indicates a position of a phenomenon in which an image is visually recognized darkly because of the drying unevenness on the paper P.

F15A of FIG. 15 shows a case in which both the projection portions 44A of the printing drum 42 and the hole portions 110B of the conveying belt 110 are in a square arrangement, and both the projection portion row formed by the projection portions 44A and the hole portion row formed by the hole portions 110B are parallel to the paper width direction. As shown in F15A, a line of the phenomenon in which an image appears dark and a line of the phenomenon in which an image appears faint are generated in the paper width direction, and the line of the phenomenon in which an image appears dark is inserted between the lines of the phenomenon in which an image appears faint. Therefore, the line of the phenomenon in which an image appears dark appears darker.

F15B of FIG. 15 shows a case in which the projection portions 44A of the printing drum 42 are in a square arrangement, the hole portions 110B of the conveying belt 110 are in a zigzag arrangement, and both the projection portion row formed by the projection portions 44A and the hole portion row formed by the hole portions 110B are parallel to the paper width direction. Similarly to the case of F15A, a line of the phenomenon in which an image appears dark and a line of the phenomenon in which an image appears faint are generated in the paper width direction, and the line of the phenomenon in which an image appears dark is inserted between the lines of the phenomenon in which an image appears faint. Therefore, the line of the phenomenon in which an image appears dark appears darker.

F15C of FIG. 15 shows a case in which the projection portions 44A of the printing drum 42 are in a square arrangement, the projection portion row formed by the projection portions 44A is parallel to the paper width direction, the hole portions 110B in the conveying belt 110 are in a square 10° arrangement inclined with respect to the paper width direction by 10°, and the hole portion row formed by the hole portions 110B is inclined with respect to the paper width direction by 10°. As shown in F15C, a line of the phenomenon in which an image appears faint is inclined with respect to the paper width direction by 10°, and a line of the phenomenon in which an image appears dark, which generates in the paper width direction, does not have periodicity. Therefore, the drying unevenness is made less visible.

Here, although an example has been described in which the projection portion row is in the paper width direction and the hole portion row is inclined with respect to the paper width direction by 10°, since the principle that no periodic difference in shading occurs is the same, the row inclined with respect to the paper width direction can be either the projection portion or the hole portion. In addition, it is not necessary that any one of the projection portion row or the hole portion row is in the paper width direction, and the direction of the projection portion row and the direction of the hole portion row need only be different from each other.

Figure 16:
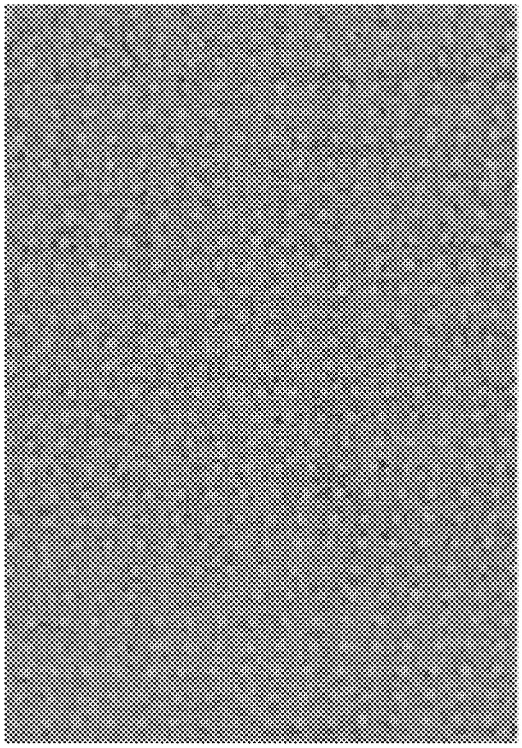
FIG. 16 is an image showing actual drying unevenness.
Figure 16:
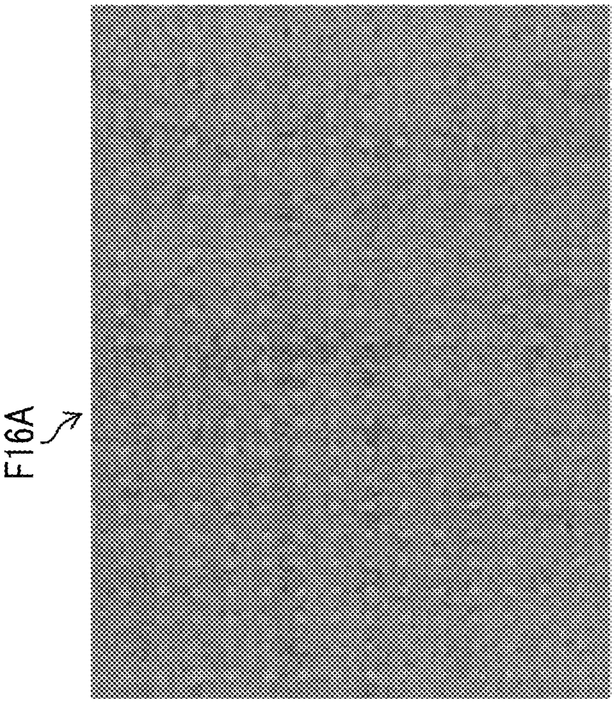

FIG. 16 is an image showing actual drying unevenness. F16A shown in FIG. 16 is the drying unevenness in the case shown in F15A of FIG. 15. The line of the phenomenon in which an image appears dark is inserted between the lines of the phenomenon in which an image appears faint, and the drying unevenness is easily visually recognized because of the periodic difference in shading. On the other hand, F16B shown in FIG. 16 is the drying unevenness in the case shown in F15C of FIG. 15. It can be seen that no periodic difference in shading occurs, and that the drying unevenness is less visible.

Definition of Angles of Hole Portion Row and Projection Portion Row

Figure 17:
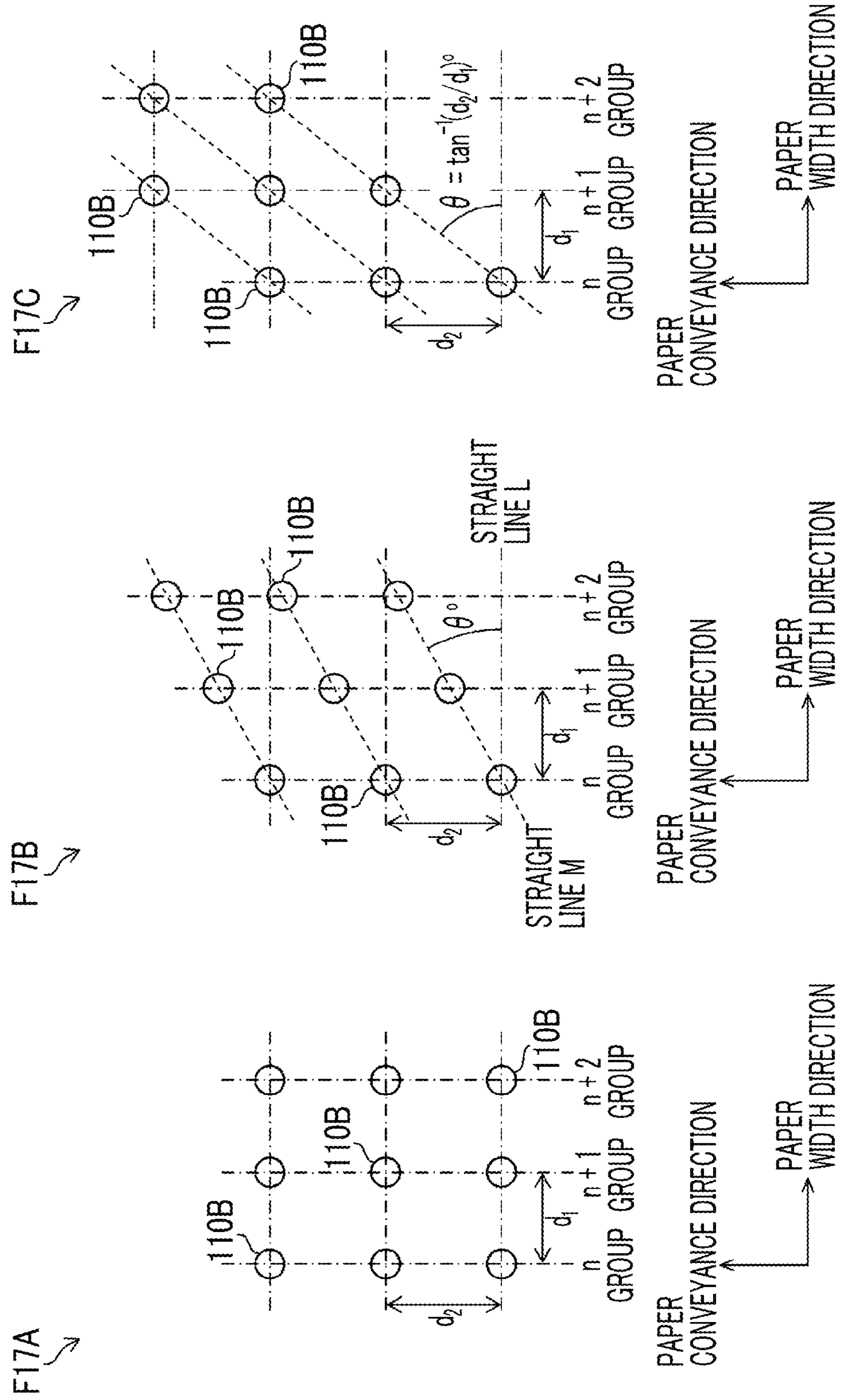
FIG. 17 is a diagram for explaining definition of angles of hole portion rows with respect to a paper width direction.

FIG. 17 is a diagram for explaining definition of angles of the hole portion rows with respect to the paper width direction. Here, although the hole portion row formed by the hole portions 110B will be described, the same applies to the projection portion row formed by the projection portions 44A.

F17A of FIG. 17 shows an example in which the hole portions 110B are in a square 0° arrangement (square arrangement). In the case of the square 0° arrangement, the hole portions 110B are disposed at regular intervals in the paper width direction and disposed at regular intervals in the paper conveyance direction.

The hole portions 110B form a group of the hole portions 110B whose center positions are present on a straight line parallel to the paper conveyance direction. In the example shown in F17A, there are three groups of an n group, an (n+1) group, and an (n+2) group from the left side of F17A. A distance between the n group and the (n+1) group in the paper width direction and a distance between the (n+1) group and the (n+2) group in the paper width direction, that is, a distance between groups is denoted by $d_1$. In addition, a distance between centers of the hole portions 110B adjacent to each other in the paper conveyance direction is denoted by $d_2$. A relationship of $d_1=d_2$ may be satisfied.

F17B in FIG. 17 shows an example in which the hole portions 110B are in a square θ° arrangement. The square θ° arrangement refers to an arrangement in which the center position of the hole portion 110B in the (n+2)th group passes on a line M which is shifted by θ° with respect to the center position of the hole portion 110B in the nth group from a straight line L parallel to the paper width direction and passing through the center position of the hole portion 110B in the nth group. Regarding θ, a counterclockwise rotation direction is assumed to be positive with respect to the center position of the hole portion 110B in the nth group. In the square θ° arrangement, the distance between groups is $d_1$ as in the square 0° arrangement. In addition, in the square θ° arrangement, the distance between centers of the hole portions 110B adjacent to each other in the paper conveyance direction of the n group, the (n+1) group, the (n+2) group, . . . , is $d_2$ as in the square 0° arrangement.

F17C of FIG. 17 shows an example in which the hole portions 110B are in a square θ° arrangement and $\theta=\tan^{-1}(d_2/d_1)°$. As shown in F17C, in a case of $\theta=\tan^{-1}(d_2/d_1)°$, in the square θ° arrangement, the hole portions 110B are disposed at regular intervals in the paper width direction and disposed at regular intervals in the paper conveyance direction. That is, the square θ° arrangement of $\theta=\tan^{-1}(d_2/d_1)°$ has the same array as the square 0° arrangement.

Figure 18:
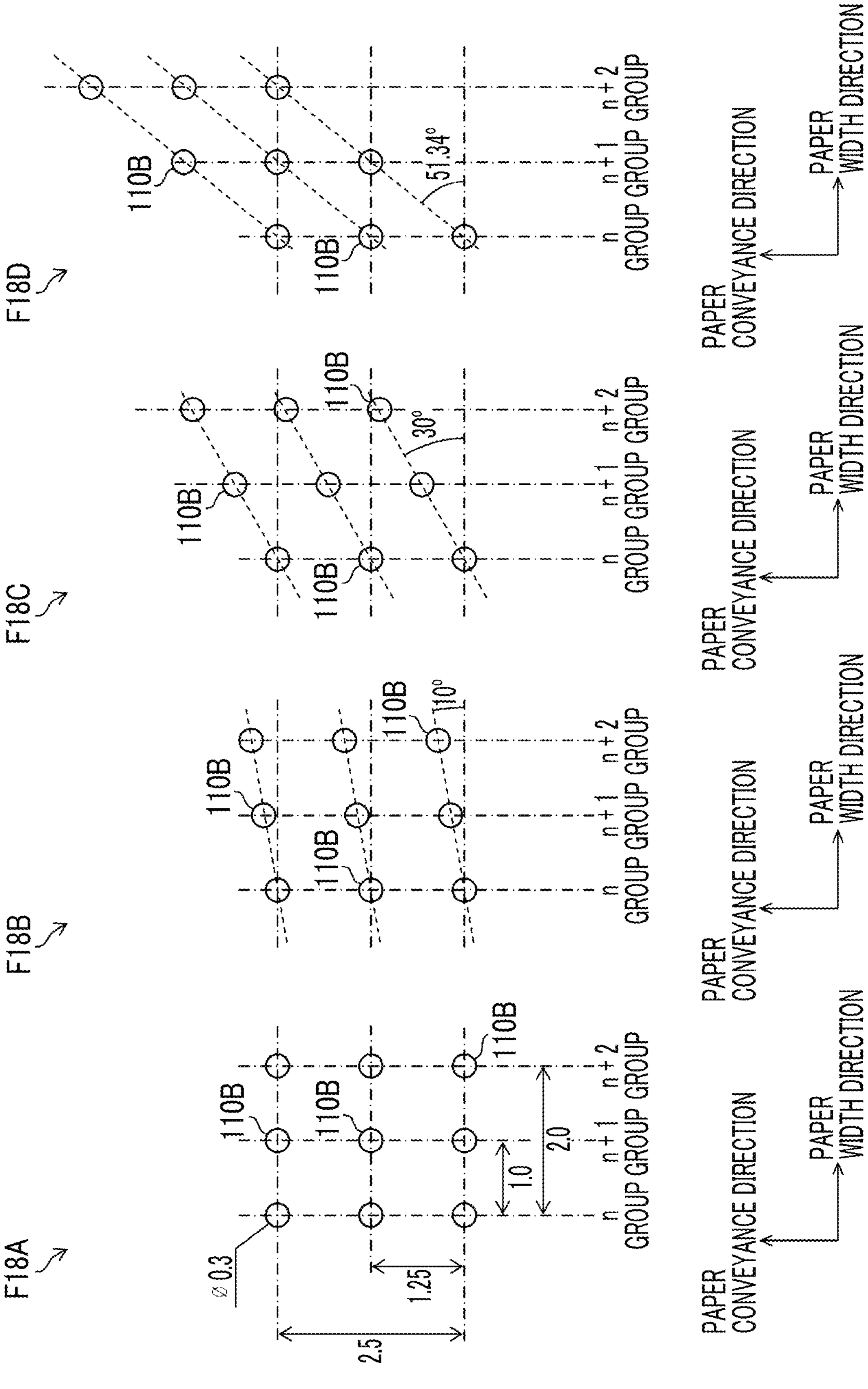
FIG. 18 is a diagram showing a specific example of angles of hole portion rows in a square arrangement.

FIG. 18 is a diagram showing a specific example of angles of the hole portion rows in the square arrangement. Here, although the hole portion row formed by the hole portions 110B will be described, the same applies to the projection portion row.

F18A in FIG. 18 shows an example in which the hole portions 110B are in a square 0° arrangement. Here, the diameter of the hole portion 110B is 0.3 mm, the distance between groups of the hole portions 110B is 1.0 mm, and the distance between centers of the hole portions 110B adjacent to each other in the paper conveyance direction is 1.25 mm. That is, $d_1$=1.0 mm and $d_2$=1.25 mm.

F18B in FIG. 18 shows an example in which the hole portions 110B are in a square 10° arrangement, and F18C in FIG. 18 shows an example in which the hole portions 110B are in a square 30° arrangement. In each case, the distance between groups of the hole portions 110B is 1.0 mm, and the distance between centers of the hole portions 110B adjacent to each other in the paper conveyance direction is 1.25 mm, as in the case of the square 0° arrangement.

F18D in FIG. 18 shows an example in which the hole portions 110B are in a square 51.34° arrangement, that is, in a square $\{\tan^{-1}(1.25/1.0)\}°$ arrangement. As shown in F18D, the square 51.34° arrangement is the same as the square 0° arrangement.

Figure 19:
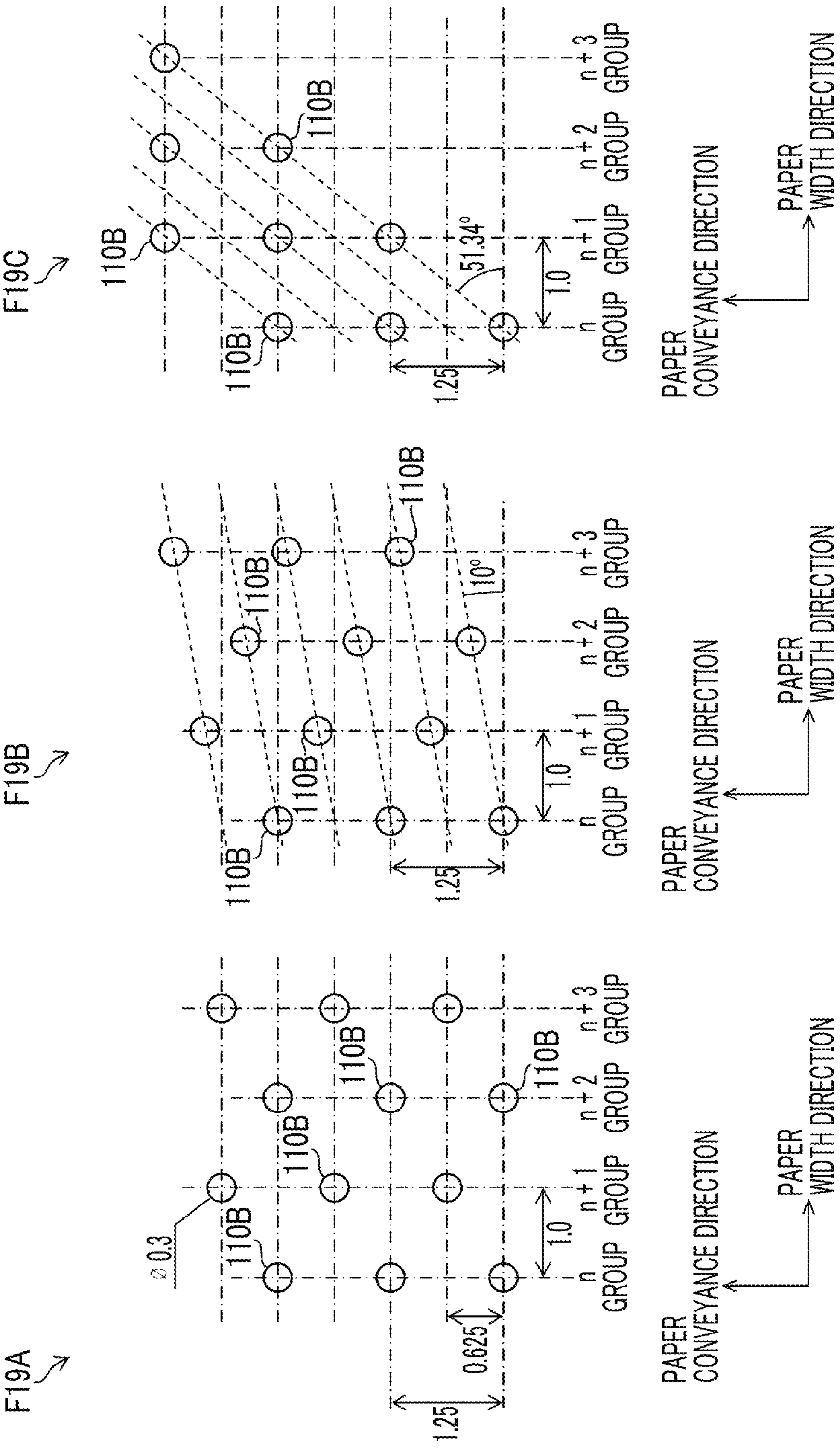
FIG. 19 is a diagram showing a specific example of angles of hole portion rows in a zigzag arrangement.

FIG. 19 is a diagram showing a specific example of angles of the hole portion rows in a zigzag arrangement. Here, although the hole portion row formed by the hole portions 110B will be described, the same applies to the projection portion row.

F19A in FIG. 19 shows an example in which the hole portions 110B are in a zigzag 0° arrangement. Here, the diameter of the hole portion 110B is 0.3 mm, and the distance between groups of the hole portions 110B is 1.0 mm. The distance between centers of the hole portions 110B adjacent to each other in the paper width direction is 2.0 mm, and the distance between centers of the hole portions 110B adjacent to each other in the paper conveyance direction is 1.25 mm. That is, $d_1$=1.0 mm and $d_2$=1.25 mm.

F19B in FIG. 19 shows an example in which the hole portions 110B are in a zigzag 10° arrangement. The distance between groups of the hole portions 110B is 1.0 mm, and the distance between centers of the hole portions 110B adjacent to each other in the paper conveyance direction is 1.25 mm, as in the case of the zigzag 0° arrangement.

F19C in FIG. 19 shows an example in which the hole portions 110B are in a zigzag 51.34° arrangement, that is, in a zigzag $\{\tan^{-1}(1.25/1.0)\}°$ arrangement. In this case as well, the distance between groups of the hole portions 110B is 1.0 mm, and the distance between centers of the hole portions 110B adjacent to each other in the paper conveyance direction is 1.25 mm. As shown in F19C, the zigzag 51.34° arrangement is the same as the zigzag 0° arrangement.

Angle of Hole Portion Row and Projection Portion Row and Visibility

FIG. 20 is a table showing evaluation results of a relationship between angles of the hole portion rows and the projection portion rows with respect to the paper width direction and the visibility of the drying unevenness. Evaluation conditions are such that the projection portion 44A of the printing drum 42 and the hole portion 110B of the conveying belt 110 are both in a square arrangement, the diameter of the projection portion 44A is 1.0 mm, and the diameter of the projection portion 44A is 0.3 mm. Here, the projection portion row formed by the projection portions 44A is parallel to the paper width direction, and the angle of the hole portion row formed by the hole portions 110B was evaluated by changing the counterclockwise rotation direction as positive to 0.9°, 1°, 10°, $\{\tan^{-1}(d_2/d_1)-1\}°$, and $\{\tan^{-1}(d_2/d_1)-0.9\}°$. In addition, $d_1$ is a distance between groups in the direction orthogonal to the paper conveyance direction in a plurality of groups formed by the hole portions 110B whose center positions are present on a straight line parallel to the paper conveyance direction, and $d_2$ is a distance between centers of the hole portions 110B adjacent to each other in the paper conveyance direction.

The visibility of the drying unevenness was classified as follows. Classifications A, B, and C represent acceptable levels, and classification D represents an acceptable level.

A: Very good (no drying unevenness is visible).

B: Worse than A and better than C.

C: Good (almost no drying unevenness is visible).

D: Bad (drying unevenness is visible).

As shown in FIG. 20, determinations for the evaluation results in a case in which the angle of the hole portion row with respect to the projection portion row is 0.9°, 1°, 10°, $\{\tan^{-1}(d_2/d_1)-1\}°$, and $\{\tan^{-1}(d_2/d_1)-0.9\}°$ were D, B, A, B, and D, respectively. From this results, in a case in which the projection portion row formed by the projection portions 44A is parallel to the paper width direction, it was found that the hole portion row formed by the hole portions 110B preferably has an angle of 1° or more and $\{\tan^{-1}(d_2/d_1)-1\}°$ or less with respect to the paper width direction, in order to eliminate the periodicity of the drying unevenness.

Regarding the angle of the hole portion row described here, the counterclockwise rotation direction is assumed to be positive with respect to the center position of the hole portion 110B in the nth group, but it is considered that the above relationship holds true also in a case in which a clockwise rotation direction is assumed to be positive.

In view of the principle of the periodicity of the drying unevenness, in a case in which the hole portion row formed by the hole portions 110B is parallel to the paper width direction, the projection portion row formed by the projection portions 44A preferably has an angle of 1° or more and $\{\tan^{-1}(d_2/d_1)-1\}°$ or less with respect to the paper width direction, in order to eliminate the periodicity of the drying unevenness. That is, it is preferable that the direction of the projection portion row and the direction of the hole portion row have an angle of 1° or more and $\{\tan^{-1}(d_2/d_1)-1\}°$ or less.

Another Aspect of Angles of Hole Portion Row and Projection Portion Row

Up to this point, although an example of changing the angle of the hole portion row and the projection portion row by changing the disposition of the hole portions and the projection portions has been described, the angle of the hole portion row and the projection portion row may be changed while maintaining the disposition of the hole portions and the projection portions.

Figure 21:
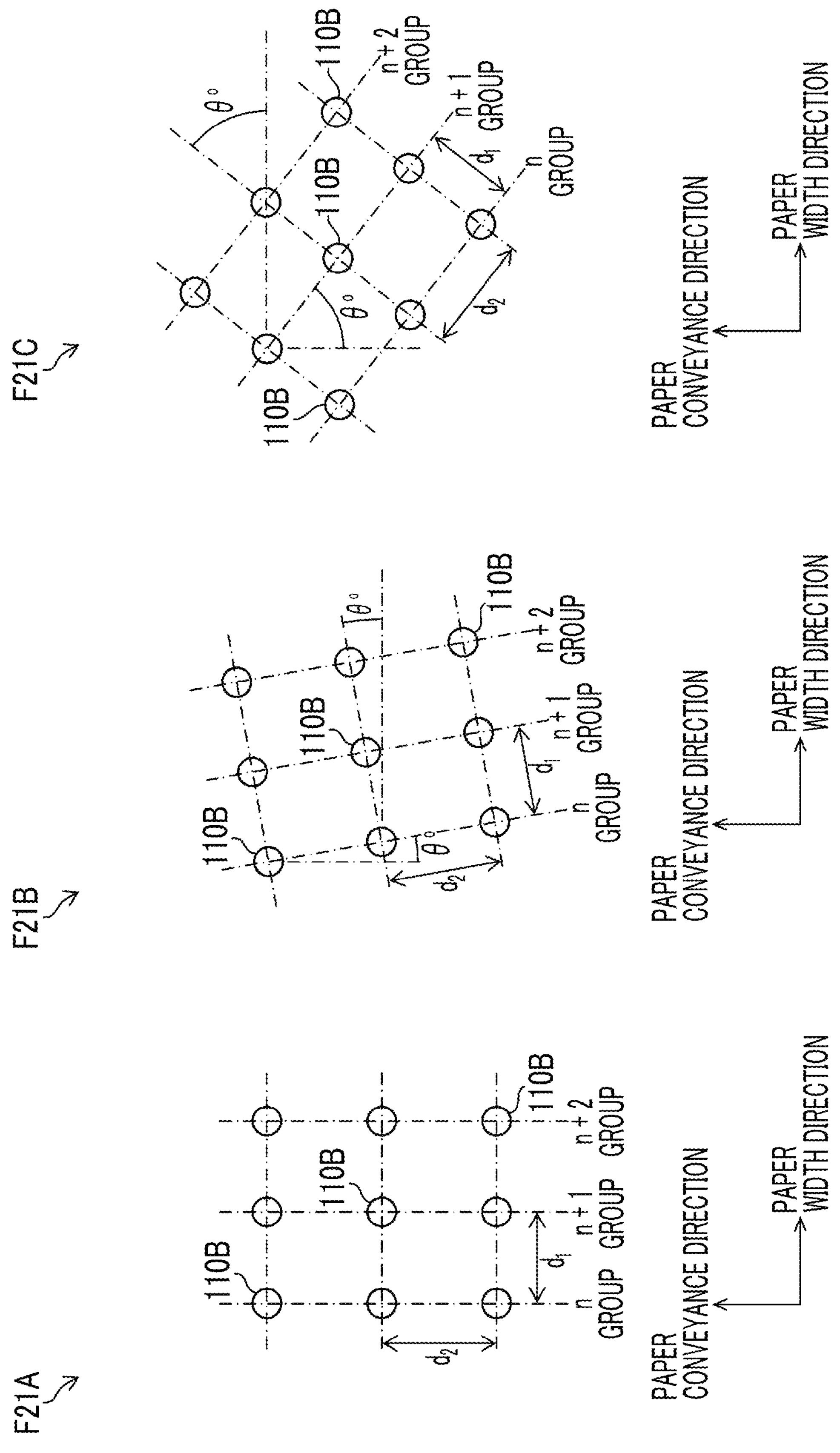
FIG. 21 is a diagram for explaining definition of angles of hole portion rows with respect to a paper width direction in another aspect.

FIG. 21 is a diagram for explaining definition of angles of the hole portion rows with respect to the paper width direction in another aspect.

F21A of FIG. 21 shows an example in which the hole portions 110B are in a square 0° arrangement, and the square 0° arrangement is at 0° with respect to the paper width direction. In a case in which the square 0° arrangement is at 0°, the hole portions 110B are disposed at regular intervals in the paper width direction and disposed at regular intervals in the paper conveyance direction.

The hole portions 110B form a group of the hole portions 110B whose center positions are present on a straight line parallel to the paper conveyance direction, as in the example shown in F17A. A distance between the n group and the (n+1) group in the paper width direction and a distance between the (n+1) group and the (n+2) group in the paper width direction, that is, a distance between groups is denoted by $d_1$. In addition, a distance between centers of the hole portions 110B adjacent to each other in the paper conveyance direction is denoted by $d_2$. A relationship of $d_1=d_2$ may be satisfied.

F21B of FIG. 21 shows an example in which the hole portions 110B are in a square 0° arrangement, and the square 0° arrangement is inclined by θ° with respect to the paper width direction. In a case in which the square 0° arrangement is inclined by θ°, the center positions of the hole portions 110B of each of the n group, the (n+1) group, and the (n+2) group are parallel to each other on a straight line inclined by θ° with respect to the paper conveyance direction.

F21C of FIG. 21 shows an example in which the hole portions 110B are in a square 0° arrangement, the square 0° arrangement is inclined by θ° with respect to the paper width direction, and $\theta=\tan^{-1}(d_2/d_1)°$. As shown in F21C, in a case of $\theta=\tan^{-1}(d_2/d_1)°$, the hole portions 110B are disposed in parallel to the paper width direction.

In view of the principle of the periodicity of the drying unevenness, in a case in which the projection portion row formed by the projection portions 44A is parallel to the paper width direction, the hole portions 110B in a square 0° arrangement preferably have an angle of 1° or more and $\{\tan^{-1}(d_2/d_1)-1\}°$ or less with respect to the paper width direction, in order to eliminate the periodicity of the drying unevenness. Similarly, in a case in which the hole portion row formed by the hole portions 110B is parallel to the paper width direction, the projection portions 44A in a square 0° arrangement preferably have an angle of 1° or more and $\{\tan^{-1}(d_2/d_1)-1\}°$ or less with respect to the paper width direction, in order to eliminate the periodicity of the drying unevenness.

Regarding the angle of the hole portion row described here, the counterclockwise rotation direction is assumed to be positive with respect to the center position of the hole portion 110B in the nth group, but it is considered that the above relationship holds true also in a case in which a clockwise rotation direction is assumed to be positive.

Here, although the example of changing the angle of the hole portion row while maintaining the disposition of the hole portions 110B in a square 0° arrangement has been described, the angle of the hole portion row may be changed while maintaining the disposition of the hole portions 110B in a square θ° arrangement, and the angle of the hole portion row may be changed while maintaining the disposition of hole portions 110B in a zigzag 0° arrangement or in a zigzag θ° arrangement. In addition, although the hole portion row formed by the hole portions 110B has been described, the same applies to the projection portion row formed by the projection portions 44A.

Difference in Moving Speed Between Holding Part and Guide Surface

Although a holding part for holding the paper and a guide surface for guiding the paper are driven at substantially the same moving speed in order to convey the paper with high accuracy and sufficiently heat the paper, it is preferable that the moving speeds are different from each other. The difference in moving speed need only be a speed difference such that the shift amount between the holding part and the guide surface≥the diameter of the hole portion and the projection portion. That is, a difference between the moving speed of the holding member and the moving speed of the guide surface is a difference in moving speed such that a difference in moving distance between the holding member and the guide surface during a period in which the second surface of the recording medium is in contact with the guide surface is equal to or greater than the diameter of the hole portion and the projection portion or the diameter of the inscribed circle inscribed in the hole portion and the projection portion.

In the ink jet recording device 30, the drying section 50 conveys the paper P by the chain gripper 70 and the attraction conveyor 100. Therefore, it is preferable that the gripper 74 of the chain gripper 70 that holds the paper P and the conveying belt 110 of the attraction conveyor 100 that corresponds to the guide surface for guiding the paper P have different moving speeds. Thereby, a state in which the paper P is in constant contact with the conveying belt 110 at the same area can be released, and the drying unevenness can be suppressed.

The speed difference between the gripper 74 and the conveying belt 110 need only be a speed difference such that the shift amount between the gripper 74 and the conveying belt 110 during a period in which the paper P is guided and conveyed by the conveying belt 110 is equal to or greater than the diameter of the hole portion 110B of the conveying belt 110.

In addition, in a case in which the moving speed of the conveying belt 110 is ½ or more of the moving speed of the gripper 74, there is an effect of suppressing the drying unevenness.

Others

As described above, by devising the diameters and arrangements of the projection portions and the hole portions of the guide surface, it is possible to realize a decrease in visibility of the drying unevenness. In addition, by driving the guide surface in conjunction with the paper, the paper conveyability and the dryability are improved, and a role of conveyance drying in the related art can be sufficiently satisfied.

In the present embodiment, although an example of the sheet-fed paper P has been described as the recording medium, various sheet bodies can be used regardless of a resin sheet, a film, or any other material and shape, as the recording medium.

The technical scope of the present invention is not limited to the scope described in the above-described embodiment.

The configurations and the like in each embodiment can be appropriately combined among the respective embodiments without departing from the spirit of the present invention.

Explanation of References

10: guide surface
12: projection portion
14: hole portion
20: guide surface
22: hole portion
30: ink jet recording device
40: printing section
42: printing drum
42A: outer peripheral surface
43: drum main body
44: ceramic jacket
44A: projection portion
44B: hole portion
46: gripper
48C: ink jet head
48K: ink jet head
48M: ink jet head
48Y: ink jet head
50: drying section
60: stacking section
62: stacking device
70: chain gripper
72: chain
74: gripper
80: first guide
84: second guide
90: heating and drying treatment device
100: attraction conveyor
110: conveying belt
110A: conveying surface
110B: hole portion
110C: hole portion row
112: drive pulley
114: driven pulley
116: attraction unit
118: blower
132: chamber
134: porous attraction plate
136: wear resistant sheet
150: system controller
152: conveyance controller
152A: motor
152B: motor
152C: motor
154: image formation controller
156: drying controller
158: stacking controller
I: ink
L: straight line
M: straight line
P: paper

What is claimed is:

1. A conveyance device comprising:

a holding member that holds a recording medium having a first surface onto which liquid is applied;

a guide member having a guide surface that comes into contact with a second surface that is a surface opposite to the first surface of the recording medium; and a drive mechanism that drives the holding member and the guide member in a conveyance direction, wherein the guide surface has either or both of hole portions and projection portions, and a diameter of the hole portion and the projection portion, or a diameter of an inscribed circle inscribed in the hole portion and the projection portion is 0.31 mm or less.

2. The conveyance device according to claim 1, wherein the diameter of the hole portion and the projection portion, or the diameter of the inscribed circle inscribed in the hole portion and the projection portion is 0.3 mm or less.

3. The conveyance device according to claim 1, wherein the diameter of the hole portion and the projection portion, or the diameter of the inscribed circle inscribed in the hole portion and the projection portion is 0.1 mm or more.

4. The conveyance device according to claim 1, wherein the hole portions and the projection portions are arranged in a direction with an angle of 1° with respect to a direction orthogonal to the conveyance direction.

5. The conveyance device according to claim 4, wherein, in a case in which $d_1$ is a distance between groups in a direction orthogonal to the conveyance direction in a plurality of groups formed by either or both of the hole portions and the projection portions whose center positions are present on a straight line parallel to the conveyance direction, and $d_2$ is a distance between centers of either or both of the hole portions and the projection portions adjacent to each other in the conveyance direction, the hole portions and projection portions are arranged in a direction with an angle of $\{\tan^{-1}(d_2/d_1)-1\}°$ or less with respect to the direction orthogonal to the conveyance direction.

6. The conveyance device according to claim 1, wherein the guide surface has the hole portions, and an opening ratio per unit area of the hole portions on the guide surface is in a range of 3% or more and 9% or less.

7. The conveyance device according to claim 1, wherein the guide surface has the projection portions, and a proportion per unit area of the projection portions on the guide surface is in a range of 3.8% or more and 12.6% or less.

8. The conveyance device according to claim 1, wherein the drive mechanism drives the holding member and the guide member by making a moving speed of the holding member and a moving speed of the guide surface different from each other.

9. The conveyance device according to claim 1, wherein the guide member is a cylindrical drum, the guide surface is an outer peripheral surface of the drum, the holding member is a gripper provided on the drum, and the drive mechanism rotates the drum about an axis of the drum.

10. The conveyance device according to claim 1, wherein the holding member is a gripper attached to an endless chain, the guide member is an endless belt, the guide surface is a surface of the belt, and the drive mechanism drives the gripper and the belt in the conveyance direction.

11. The conveyance device according to claim 1, further comprising:

a drying mechanism that heats the first surface of the recording medium of which the second surface is in contact with the guide surface.

12. A printing device comprising:

a first conveyance device that conveys a recording medium in a conveyance direction;

a liquid jetting head that jets liquid onto a first surface of the recording medium to be conveyed by the first conveyance device to form an image;

a second conveyance device that is disposed on a downstream side in the conveyance direction with respect to the first conveyance device and that conveys the recording medium in the conveyance direction; and a drying mechanism that dries the liquid of the recording medium to be conveyed by the second conveyance device, wherein the first conveyance device includes a first holding member that holds the recording medium, a first guide member having a first guide surface that comes into contact with a second surface that is a surface opposite to the first surface of the recording medium, and a first drive mechanism that drives the first guide member in the conveyance direction, the first guide surface has either or both of first hole portions and first projection portions, a diameter of the first hole portion and the first projection portion, or a diameter of an inscribed circle inscribed in the first hole portion and the first projection portion is 0.31 mm or less, the second conveyance device includes a second holding member that holds the recording medium, a second guide member having a second guide surface that comes into contact with the second surface of the recording medium, and a second drive mechanism that drives the second guide member in the conveyance direction, the second guide surface has either or both of second hole portions and second projection portions, a diameter of the second hole portion and the second projection portion, or a diameter of an inscribed circle inscribed in the second hole portion and the second projection portion is 0.31 mm or less, and one of a first direction in which either or both of the first hole portions or the first projection portions are arranged, and a second direction in which either or both of the second hole portions and the second projection portions are arranged is a direction orthogonal to the conveyance direction, and the other has an angle of 1° or more and $\{\tan^{-1}(d_2/d_1)-1\}°$ or less with respect to the direction orthogonal to the conveyance direction, where, in a case in which the first direction is the direction orthogonal to the conveyance direction, $d_1$ is a distance between groups in the direction orthogonal to the conveyance direction in a plurality of groups formed by either or both of the second hole portions and the second projection portions whose center positions are present on a straight line parallel to the conveyance direction, and $d_2$ is a distance between centers of either or both of the second hole portions and the second projection portions adjacent to each other in the conveyance direction, and in a case in which the second direction is the direction orthogonal to the conveyance direction, $d_1$ is a distance between groups in the direction orthogonal to the conveyance direction in a plurality of groups formed by either or both of the first hole portions and the first projection portions whose center positions are present on the straight line parallel to the conveyance direction, and $d_2$ is a distance between centers of either or both of the first hole portions and the first projection portions adjacent to each other in the conveyance direction.

* * * * *